United States Patent
Jurzak et al.

(10) Patent No.: US 11,637,885 B2
(45) Date of Patent: Apr. 25, 2023

(54) SYSTEM AND METHOD FOR SENDING AND RENDERING AN IMAGE BY A DEVICE BASED ON RECEIVER'S CONTEXT

(71) Applicant: MOTOROLA SOLUTIONS, INC., Chicago, IL (US)

(72) Inventors: Pawel Jurzak, Cracow (PL); Maciej Stawiszynski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/975,182

(22) PCT Filed: Jun. 7, 2018

(86) PCT No.: PCT/PL2018/050024
§ 371 (c)(1),
(2) Date: Aug. 24, 2020

(87) PCT Pub. No.: WO2019/235946
PCT Pub. Date: Dec. 12, 2019

(65) Prior Publication Data
US 2021/0367991 A1    Nov. 25, 2021

(51) Int. Cl.
*H04L 29/06*    (2006.01)
*H04L 29/08*    (2006.01)
*G06F 16/58*    (2019.01)
*G06K 9/00*    (2022.01)
*H04L 65/80*    (2022.01)
(Continued)

(52) U.S. Cl.
CPC .......... *H04L 65/80* (2013.01); *G06F 16/5866* (2019.01); *H04L 65/70* (2022.05); *H04L 65/75* (2022.05); *H04L 67/06* (2013.01); *G06V 20/00* (2022.01); *G06V 20/63* (2022.01); *G06V 40/161* (2022.01)

(58) Field of Classification Search
CPC ..... H04L 65/80; H04L 65/602; H04L 65/605; H04L 67/06; H04L 65/601; H04L 65/607; G06K 9/00624; G06K 9/00228; G06K 9/3258; H04N 21/23418; H04N 21/4728; G06F 16/5866
See application file for complete search history.

(56) References Cited

U.S. PATENT DOCUMENTS 8,081,635 B2    12/2011    Bekiares et al.
9,247,203 B2    1/2016    Li et al.
(Continued)

FOREIGN PATENT DOCUMENTS

WO    2012177378 A2    12/2012

OTHER PUBLICATIONS

The International Search Report and the Written Opinion corresponding patent application No. PCT/PL2018/050024, filed: Jun. 7, 2018, dated Feb. 4, 2019, all pages.

*Primary Examiner* — Abdullahi E Salad

(57) ABSTRACT

A system and method for sending an image to a user device based on the context of a user of the device are provided. An image to be sent to a user device may be obtained. The context of the user may be determined. The image may be analyzed to detect and prioritize objects in the image based on the context of the user. The image may be encoded such that objects are rendered on the user device in an order based on the prioritization. The encoded image may be sent to the user device.

16 Claims, 17 Drawing Sheets

(51) Int. Cl.
*H04L 67/06* (2022.01)
*H04L 65/75* (2022.01)
*H04L 65/70* (2022.01)
*G06V 20/00* (2022.01)
*G06V 20/62* (2022.01)
*G06V 40/16* (2022.01)

(56) References Cited

U.S. PATENT DOCUMENTS

| | | | |
|---|---|---|---|
| 9,560,160 | B1 | 1/2017 | Kolam et al. |
| 9,628,673 | B2 | 4/2017 | Hua et al. |
| 9,897,805 | B2 * | 2/2018 | Stafford ............ G02B 27/0093 |
| 2002/0071677 | A1 | 6/2002 | Sumanaweera |
| 2004/0120589 | A1 | 6/2004 | Lopresti et al. |
| 2007/0233287 | A1 * | 10/2007 | Sheshagiri ............ H04L 12/281 700/83 |
| 2012/0054662 | A1 * | 3/2012 | Kieselbach .......... G06Q 10/107 715/772 |
| 2012/0296919 | A1 * | 11/2012 | Sinha .................... H04L 67/535 707/E17.064 |
| 2012/0319928 | A1 * | 12/2012 | Rhodes ................ G02B 27/017 345/8 |
| 2013/0094775 | A1 | 4/2013 | Pomianowski et al. |
| 2014/0143328 | A1 * | 5/2014 | Miller ................... H04W 4/029 709/204 |
| 2016/0323643 | A1 * | 11/2016 | Panchaksharaiah ........................ H04N 21/4753 |
| 2016/0381416 | A1 * | 12/2016 | Fan ................. H04N 21/44218 725/14 |
| 2017/0085666 | A1 | 3/2017 | Berenger |
| 2017/0186137 | A1 * | 6/2017 | Berenger ............. G06K 9/3233 |
| 2017/0187994 | A1 | 6/2017 | Tatourian et al. |
| 2017/0347039 | A1 * | 11/2017 | Baumert ............ H04N 21/6587 |
| 2018/0060358 | A1 * | 3/2018 | Jiang ................. G06F 16/24578 |
| 2018/0123990 | A1 * | 5/2018 | Zacharias ............. H04L 67/322 |
| 2018/0218049 | A1 * | 8/2018 | Bostick ................. G06T 3/0012 |
| 2018/0349678 | A1 * | 12/2018 | Koskan ................. G06Q 10/00 |

* cited by examiner

SYSTEM AND METHOD FOR SENDING AND RENDERING AN IMAGE BY A DEVICE BASED ON RECEIVER'S CONTEXT

BACKGROUND

In the past, public safety personnel, such as police officers, firefighters, and emergency medical services technicians, may have been equipped with low bandwidth communications devices known as Land Mobile Radio (LMR) devices. One of the primary functions of LMR devices was to enable voice communication between public safety field personnel and dispatchers, commanders, and amongst themselves. LMR devices may be equipped with limited data transmission capabilities, however the data transmission is typically at lower speeds, thus restricting the amount of data that may be transferred, which in turn may limit data applications to transmitting text based information.

With the advent of broadband wireless technologies, such as Long Term Evolution (LTE) networks, mobile devices capable of high bandwidth data transmission are making their way into the hands of public safety personnel. In some cases, dedicated public safety LTE networks are being established to provide broadband services to public safety personnel. With the availability of broadband data services and devices, public safety personnel are no longer limited to voice and text communications. One capability, among many, offered by broadband data services is the ability for public safety personnel to send high resolution images from/to field personnel. High resolution images may aid field personnel in executing their job duties. For example, in the case of a police officer, a high resolution image, instead of a verbal description, of a wanted suspect may be sent to a field officer in order to aid in a search for the suspect. In such a case, an image would be of greater value than a verbal or text based description of the suspect.

High resolution images generally require a large amount of data to be transferred to the receiver. One method of transferring a high resolution image, such as a Joint Photographic Experts Group (JPEG) image, involves a progressive encoding mechanism. In a progressive encoding mechanism, an image is sent in a series of increments. The first increment may allow an initial version of the image to be seen by the receiver. The initial image is of lower quality than the original, and as such may appear fuzzy to the viewer. As additional increments of the image are sent, the image becomes progressively clearer, until the entirety of the image has been sent. At that point, the original high resolution image is available at the receiver device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
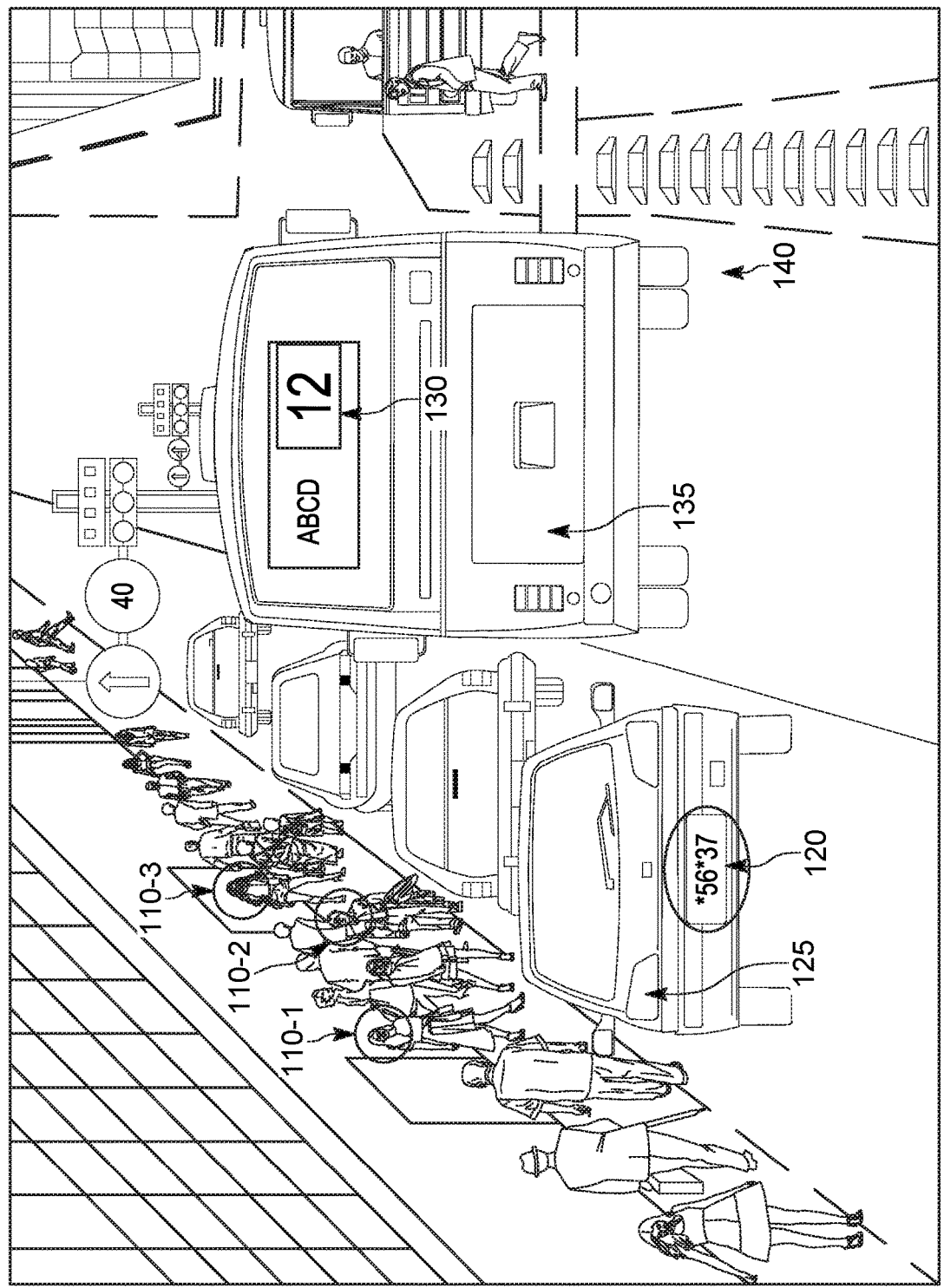
FIG. 1 is an example of an original image that is to be transmitted in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although progressive transmission of an image as described above is useful in that it allows the receiver to view a version of an image quickly, such a rendering mechanism may not be the most appropriate for use by public safety personnel. For example, consider a high resolution image of a street scene including buildings, people, cars, etc. A police officer may be interested in the license plate objects in the scene, perhaps in order to locate a stolen car. If the image is sent using a progressive encoding mechanism, it is possible that the letters and numbers on the license plates could not be discerned until a certain number of image increments have been sent. For example, assume the image is sent using 10 progressive increments, with each increment requiring 1 second to be sent to the receiver's device. Also assume that the letters and numbers on the license plate do not become clear enough for a human to read until the $8^{th}$ increment is sent. As such, a police officer receiving the image would need to wait 8 seconds (8 increments*1 second per increment) before the image is clear enough to discern the license plate contents.

In addition, the objects of interest in an image may vary depending on receiver specific criteria. In the example above, the recipient of the image may be searching for a stolen car, and as such, license plate objects in an image may be of greatest interest. Another image receiver may be in the process of conducting a missing person search, and as such is more interested in human face objects contained in the image. Thus, the particular objects of interest in any given image may be dependent on the criteria associated with a given image recipient. Receiver specific criteria may also be referred to as the receiver's context. The receiver's context can be determined based on criteria such as the receivers current task (e.g. car search, missing person search, etc.), current role (e.g. individual field officer, commander, etc.), capabilities of the receiver's device (e.g. maximum resolution, maximum data transfer speed, etc.), talk group set, etc.

Furthermore, a given context may have higher priority than another context. For example, there may be two field officers, a first engaged in a lost child search while a second is engaged in a stolen vehicle search, with all other possible context related criteria being equal. The context of first officer engaged in the lost child search may be considered of higher priority than the context of the second officer engaged in the stolen car search. Thus, image objects of interest to the first officer's context (e.g. human faces) may have a higher priority than image objects associated with the second officer's context (e.g. license plates).

The techniques described herein provide systems and methods in which an image to be sent to a receiver is analyzed to detect objects of importance in the image based on the context of the recipient. Once the objects of interest are identified, the image is encoded such that the objects of interest are prioritized such that when rendered on the recipient's device, the objects of higher priority appear clearer on the recipient's device prior to objects of lower priority. For example, in the example above in which an officer is engaged in a license plate search, the image may be encoded such that license plate objects in the image become clear within the first or first few image increments.

Thus, instead of having to wait (in the example 8 seconds) for the license plates to become readable, the plates become readable much earlier. Because the necessary information is available earlier, the receiver may be able to act on that information sooner. In some cases, the receiver may be able to determine that the current image does not contain important information earlier than in a standard process (e.g. license plate number of interest is not in image) and as such can cancel download of the current image and begin download of the next image. By presenting prioritized information sooner, the receiver is able to determine if an image is useful or not more quickly than if the entire image (or significant portions of the image) must first be transferred to the user's device. Furthermore, data packets being used to send the image to the recipient may be prioritized such that packets which include data related to higher priority objects receive higher priority (e.g. higher Quality of Service, marked as not subject to being dropped, etc.) relative to other packets.

There may be multiple recipients of an image as well, each with different contexts, with each of those contexts having a different priority. The techniques described herein provide for analyzing an image taking into consideration the contexts of the various recipients. In some cases, each recipient may receive the image with objects prioritized according to the recipient's context alone. In other cases, the objects in the images may be prioritized based on the priority of the different contexts. In some cases, all objects identified based on each context may have equivalent priority, such that priority objects are the superset of priority objects from each context. In other cases, the objects of one context may have higher priority than those of another context, and as such, those objects appear clearer sooner than objects associated with lower priority contexts, which in turn appear clearer sooner than the remaining portion of the image.

An example method for sending and rendering and image on a device based on a receiver's context is provided. The example method includes obtaining the image to be sent to the user device. The example method further includes determining the context of the user. The example method also includes analyzing the image to detect and prioritize objects in the image based on the context of the user. The example method further includes encoding the image such that the objects are rendered on the user device in an order based on the prioritization. The example method also includes sending the encoded image to the user device.

In one aspect, encoding the image further comprises providing the image to the user device incrementally, wherein each increment improves an overall quality of the image, wherein higher priority objects appear with higher quality in the image prior to a remainder of the image. In another aspect, the context further comprises at least one of a role, a talk group, a device capability, a skill, an equipment, and an assigned task. In yet another aspect, sending the image to the user device further comprises providing a higher Quality of Service (QoS) for packets containing objects with higher prioritization. In another aspect, determining the context of the user further comprises receiving from the user an indication of the user's context. In an additional aspect, determining the context of the user further comprises retrieving from a database an indication of the user's context.

The example method may also include determining a context of a second user, the second user having a second user device. The method may include analyzing the image to detect and prioritize objects in the image based on the context of the second user. The method may further include encoding the image such that objects are rendered on the second user device in an order based on the prioritization based on the context of the second user to create a seconded encoded image. The method may also include sending the second encoded image to the second user device.

In another aspect, the method may include determining the context of a second user, the second user having a second user device. The method may further include merging the context of the user and the second user prior to analyzing the image. The method may also include sending the encoded image to the second user device. In yet another aspect, the method may include determining a context of a second user, the second user having a second user device, the context of the second user having a lower priority than the context of the user. The method may also include serializing the context of the first user and the second user prior to analyzing the image. The method may also include sending the encoded image to the second user device. In yet another aspect, the method may include analyzing the image to detect and prioritize objects on a device that captures the image.

An example non-transitory processor readable medium containing a set of instructions thereon that when executed by a processor is provided herein. When executed the instructions may cause the processor to obtain an image to be sent to a user device. The instructions may further cause the processor to determine a context of a user of the user device. Additionally, the instructions may cause the processor to analyze the image to detect and prioritize objects in the image based on the context of the user. Furthermore, the instructions may cause the processor to encode the image such that objects are rendered on the user device in an order based on the prioritization. The instructions may further cause the processor to send the encoded image to the user device.

In one aspect, the instructions further cause the processor to provide the image to the user device incrementally, wherein each increment improves an overall quality of the image, wherein higher priority objects appear with higher quality in the image prior to a remainder of the image. In another aspect, the instructions further cause the processor to provide a higher Quality of Service (QoS) for packets containing objects with higher prioritization. In yet another aspect, the instructions further cause the processor to receive from the user an indication of the user's context. In yet another aspect, the instructions further cause the processor to retrieve from a database an indication of the user's context.

The example non-transitory processor readable medium may also contain instructions that cause the processor to determine a context of a second user, the second user having a second user device. The instructions may further cause the processor to analyze the image to detect and prioritize objects in the image based on the context of the second user. The instructions may also cause the processor to encode the image such that objects are rendered on the second user device in an order based on the prioritization based on the context of the second user to create a second encoded image. The instructions may further cause the processor to send the second encoded image to the second user device.

In one aspect, the instructions may cause the processor to determine a context of a second user, the second user having a second user device. The instructions may further cause the processor to merge the context of the user and the second user prior to analyzing the image. The instructions may also cause the processor to send the encoded image to the second user device. In another aspect, the instructions may cause the processor to determine a context of a second user, the second user having a second user device, the context of the second user having a lower priority than the context of the user. The instructions may further cause the processor to serialize the context of the first user and the second user prior to analyzing the image. The instructions may also cause the processor to send the encoded image to the second user device. In one aspect, the instructions further cause the processor to analyze the image to detect and prioritize objects on a device that captures the image.

An example system is provided herein. The system may include a processor. The system may also include a memory coupled to the processor. The memory may include instructions that are executable by the processor. When executed, the instructions may cause the processor to obtain an image to be sent to a user device. The instructions may further cause the processor to determine a context of a user of the user device. The instructions may further cause the processor to analyze the image to detect and prioritize objects in the image based on the context of the user. The instructions may also cause the processor to encode the image such that objects are rendered on the user device in an order based on the prioritization. The instructions may also cause the processor to send the encoded image to the user device.

FIG. 1 is an example of an original image that is to be transmitted in accordance with some embodiments. The example image shown in FIG. 1 depicts a typical street scene in an urban environment, although it should be understood that the techniques described herein are not limited to any particular type of image. The image may have been captured by any suitable device. For example, the image may have come from a standalone digital camera, a cell phone camera, a fixed or mobile surveillance camera, a vehicle mounted camera, a body worn camera, or any other suitable source. In some cases, the image may be a scan of a physical picture or other image source. Images may also include screen captures from video sources such as live television. What should be understood is that FIG. 1 represents an image usable with the techniques described herein and the source of the image is unimportant.

In the image shown in FIG. 1, there are several identifiable objects that may be of interest. For example, human faces 110-1,2,3 may be present in the image. The faces 110-1,2,3, depending on the context of an image recipient, may be the objects of interest for that recipient. The image may also contain textual identification, such as vehicle license plate number 120 on car 125. For an image recipient with a different context, the vehicle license plate number 120 may be the object of interest. Yet another object of interest may be the route number 130 shown on bus 135. For yet a different recipient, the route number 135 may be an object of interest. For aid in the description, the remainder of the image 140 may include all objects/background of the image that are not considered objects of importance to the recipient. In other words, for the following description, the possible objects of interest will be the faces 110, the vehicle license plate 120, and the bus route number 130. All other portions of the image (e.g. street signs, road markings, etc.) may be considered a remainder of the image 140.

It should be understood that identification of objects of interest through image analytics is known. There are numerous techniques for image facial identification, automatic license plate readers, image text identification, vehicle detection, and any number of other types of video analytics that may be used for image object identification. The techniques described herein are not limited to any particular type of object detection mechanism, and are usable with all currently known techniques as well as any object detection techniques developed in the future.

FIGS. 2(A-C) depict an example of progressive image formation. The progressive image formation described in FIGS. 2(A-C) does not make use of the techniques described herein, but rather is presented to describe how incremental, progressive image formation proceeds, such that the image is presented to the end user in increments, with each increment causing the end image to become progressively more clear. Once the final increment is received, the image may be as clear as the original. The image used in the example for FIGS. 2(A-C) is the same as that in FIG. 1 (e.g. a street scene with faces, vehicle license plates, bus route numbers, and the remainder of the image). For purposes of this description, images are described as being sent in three increments. However, it should be understood that this is for purposes of ease of description. An actual implementation may utilize any number of image increments, and the techniques described herein are not limited to any particular number of increments.

Figure 2A:
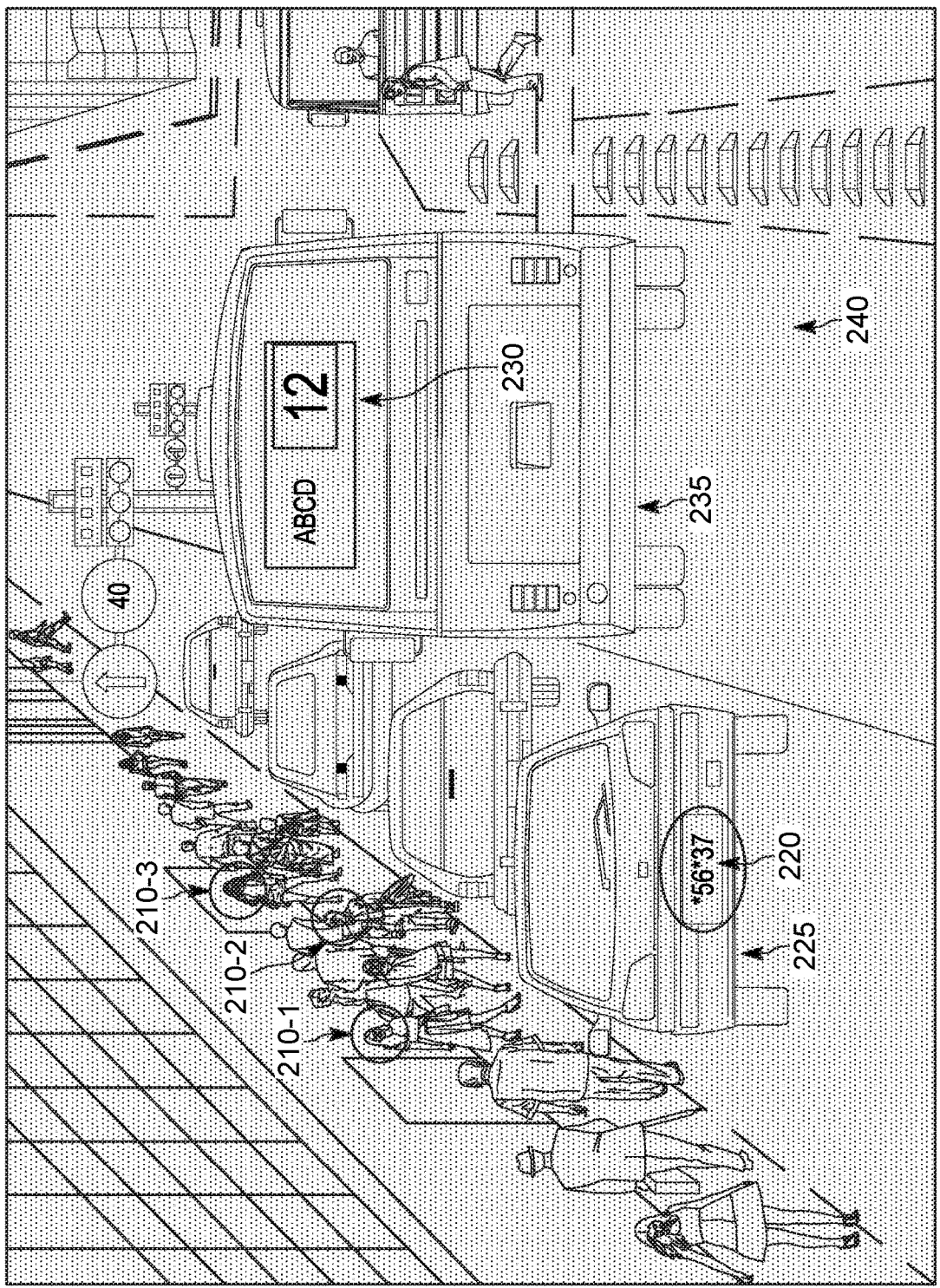
FIGS. 2(A-C) depict an example of progressive image formation.

FIG. 2A may depict the image after a first image increment is sent. As shown, in the first increment, a general depiction of the scene may be generated. As shown, the important objects are visible, but are not clear enough to make out specifics. For example, human faces 210-1,2,3 may be barely discernible, but without enough clarity to determine how many faces are present let alone for identification purposes. Likewise, vehicle 225 may be generally recognized as a vehicle, but the type of vehicle may not be readily apparent. The vehicle license plate 220 may not be readily apparent. Likewise, the bus 235 may be barely identifiable and the bus route number 230 is not comprehensible. The remainder of the image 240 may appear with a similar same lack of clarity as the objects of interest.

Figure 2B:
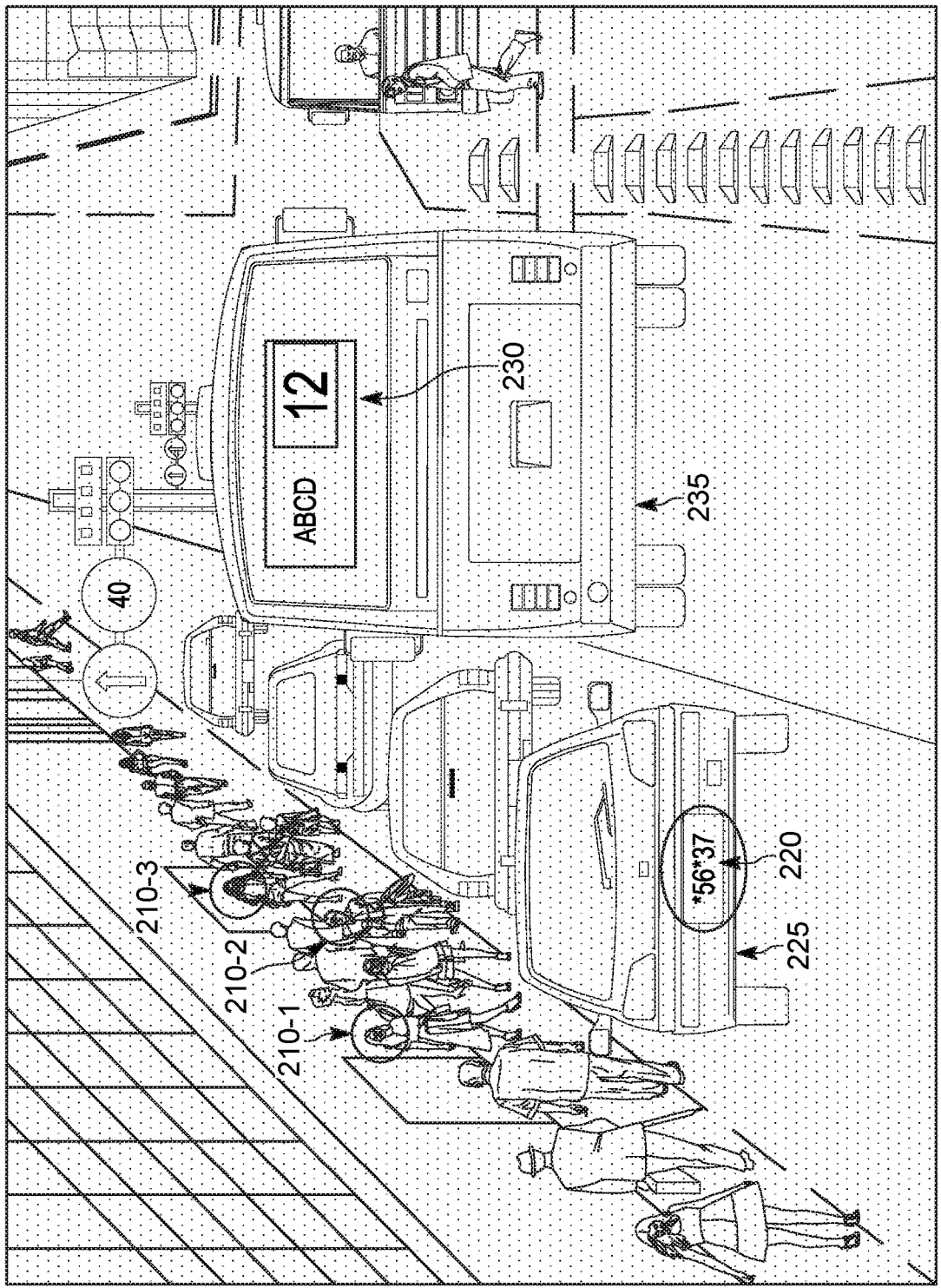

FIG. 2B may depict the image after a second increment is sent. The second increment may provide additional image details. For example, faces 210-1,2,3 may still not be identifiable, but enough detail may be sent such that the recipient may determine that there are three faces present in the scene. Likewise, the second increment may provide enough detail to allow vehicle 225 to be identified as a specific type of vehicle. However, license plate 220, although clearer, may still not be readable. Just as with vehicle 225, the second increment may cause bus 235 to be identifiable as a bus, but route number 230 may still not be readable.

Figure 2C:
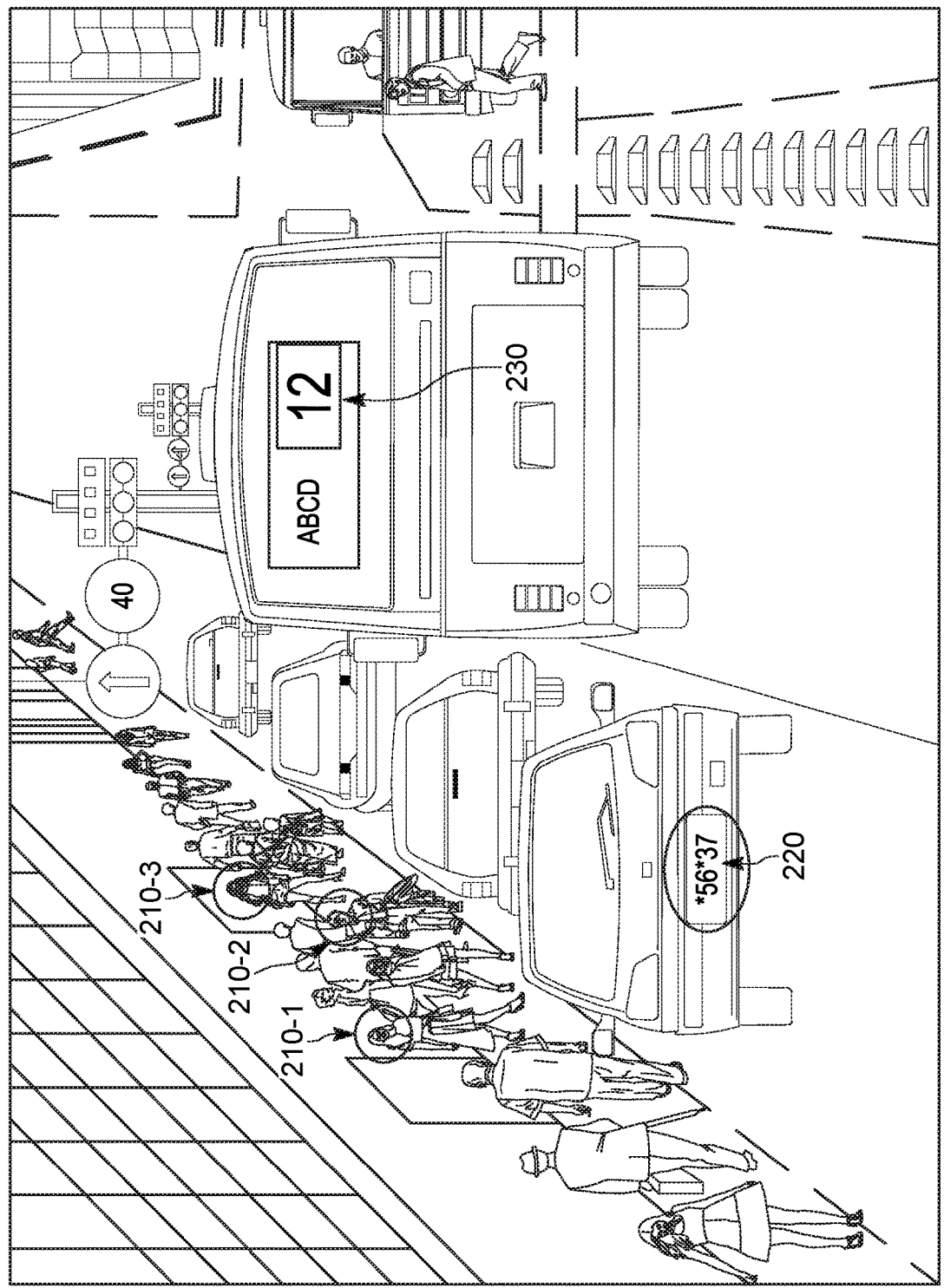

FIG. 2C may depict the image after the third and final increment of the original image is sent. As shown, all of the detail present in the original image is now available. Faces 210-1,2,3 are visible with sufficient detail to be identifiable. Both vehicle license plate 220 and bus route number 230 can be read after the third increment is received. What should be understood is that using known progressive image transmission techniques, the recipient of the image may need to wait until the complete image is received before the image is usable. For example, a public safety officer who is trying to identify license plates in an image would need to wait until the third, and final, image increment is sent until the vehicle license plate 220 is readable in the image.

FIGS. 3(A-C) depict an example of rendering an image by a device based on receiver's context in accordance with some embodiments. Assume that in the example shown in FIGS. 3(A-C) the image recipient is interested in vehicle license plate numbers. As will be explained in further detail below, the objects of interest (e.g. license plate numbers) for this particular recipient may be determined based on the context of the recipient. The original image may then be analyzed using known techniques to identify those objects of interest (e.g. license plate numbers) in the original image. The original image may then be encoded such that when rendered on the recipient's device, the objects of interest appear clearer sooner than other objects and the remainder of the image.

Figure 3A:
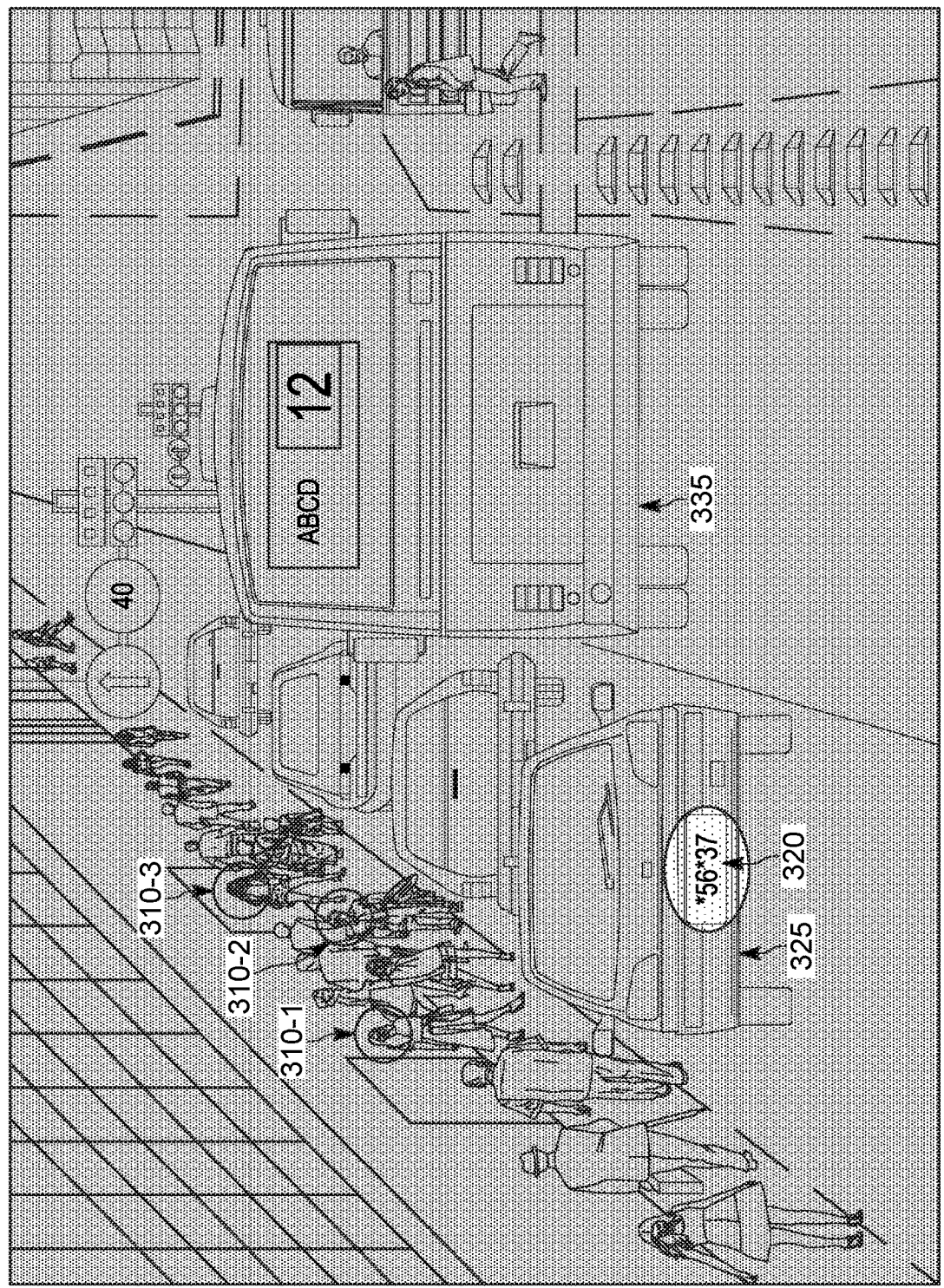
FIGS. 3(A-C) depict an example of rendering an image by a device based on receiver's context in accordance with some embodiments.

FIG. 3A may depict the image after the first increments is sent. As shown, the first increment may be encoded such that the first increment includes more data related to the objects of interest, such that those objects appear clearer. As shown, the vehicle 325 may be identifiable as a car, and the license plate 320 may be visible, but not readable. In comparison with FIG. 2, the first increment in FIG. 3A may cause the vehicle 325 and license plate 320 to appear with the same clarity as the second increment depicted in FIG. 2B.

This additional clarity may come with a price. The additional data used to cause the vehicle 325 and license plate 320 to appear clearer in the first increment may come at the expense of reducing the amount of data available for other portions of the image. As shown, the faces 310-1,2,3 and the bus 335 may appear with even less clarity than they did in the first increment of FIG. 2A. In other words, in order to make the objects of interest appear clearer, other objects may need to appear less clear.

Figure 3B:
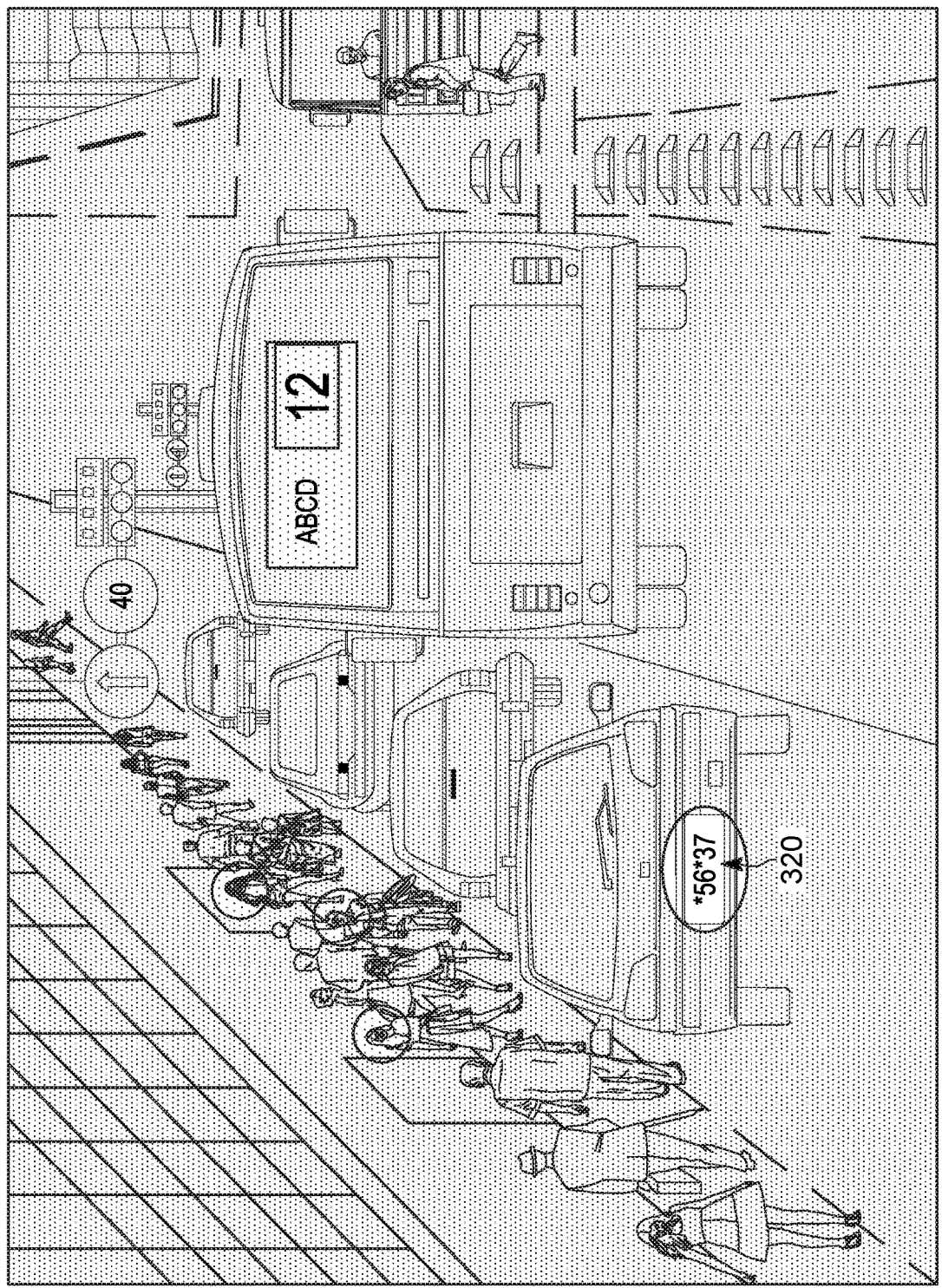

FIG. 3B may depict the original image after the second increment is sent. As shown, the license plate 320 now appears with clarity that is as good as was present in the original image. As such, after the second increment is sent, the recipient whose context indicates he is interested in license plate objects has enough information to decide if this image is relevant to him. Note, this decision can be made after the second increment is sent, unlike in the case of FIG. 2 when the third increment was needed. The recipient may decide that this image is irrelevant, and can thus move on to the next image (or stop transmission of the current image) more quickly than in the case described in FIG. 2. The techniques described herein thus can be used advantageously to first, allow the recipient to move to the next image more quickly, thus reducing the amount of time wasted by the recipient in waiting for all increments of the image to be rendered. Second, by stopping the transmission of the current image (either stopping completely, or moving on to the next image) after the second increment, the bandwidth that would have been used for the third increment is saved.

For completeness sake, in FIG. 3B, the other portions of the image (e.g. the faces, the bus route number, the remainder of the image) become progressively more clear. Again, the bandwidth used to allow the license plate object to be transmitted more clearly in the second increment may come at the expense of the bandwidth available for other portions of the image. As such, the clarity of the other objects in the second increment of FIG. 3B, is less than that of the second increment in FIG. 2B.

Figure 3C:
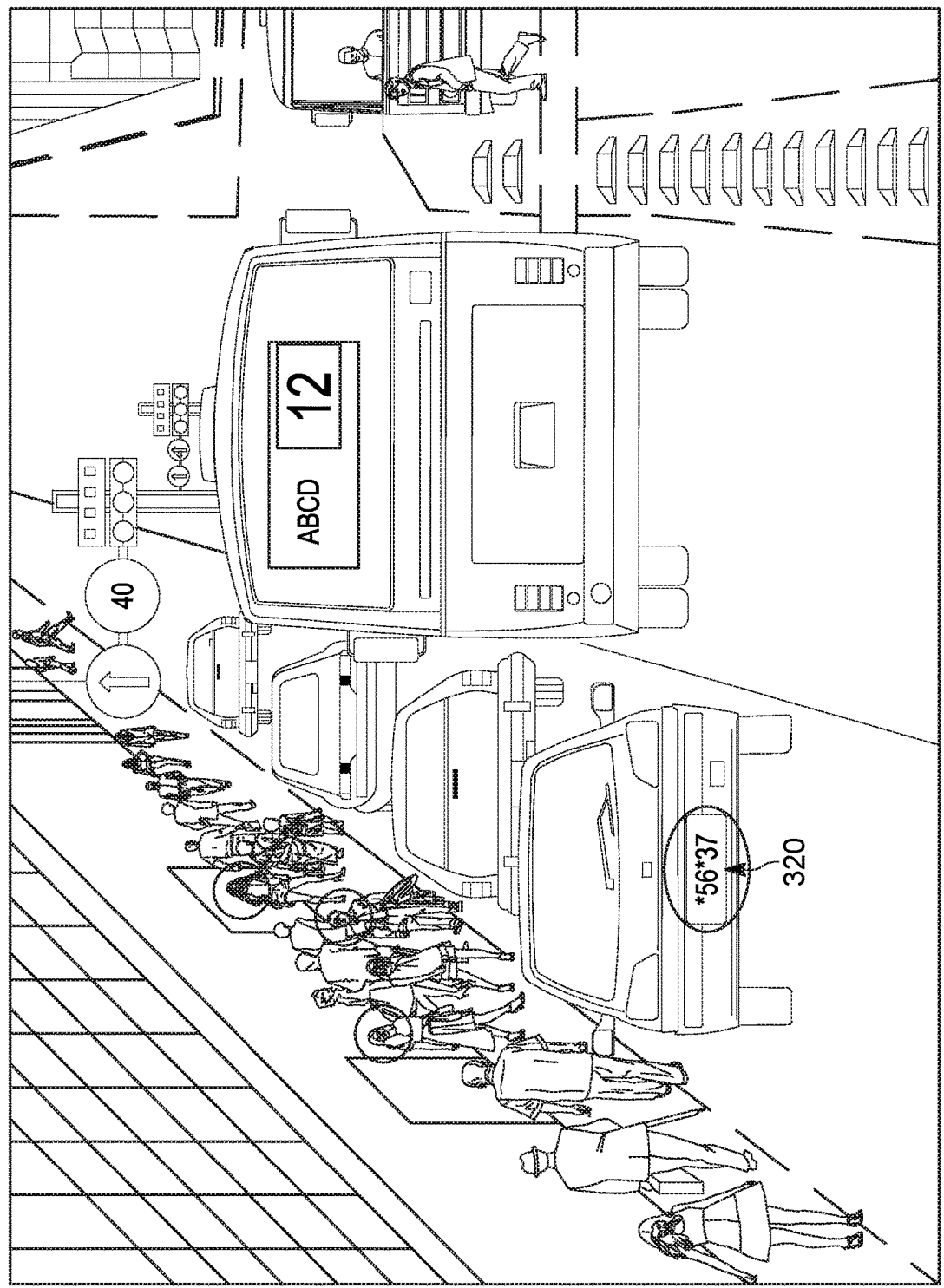

FIG. 3C may depict the image after the third increment is sent. Because the important objects (e.g. license plate 320) have now been completely sent, the excess bandwidth that was allocated to that object in increments 1 and 2 may now be available for use in transmitting the other portions of the image (e.g. faces, bus route, remainder of the image). Thus, after the third increment is sent, the original image is displayed.

Figure 4:
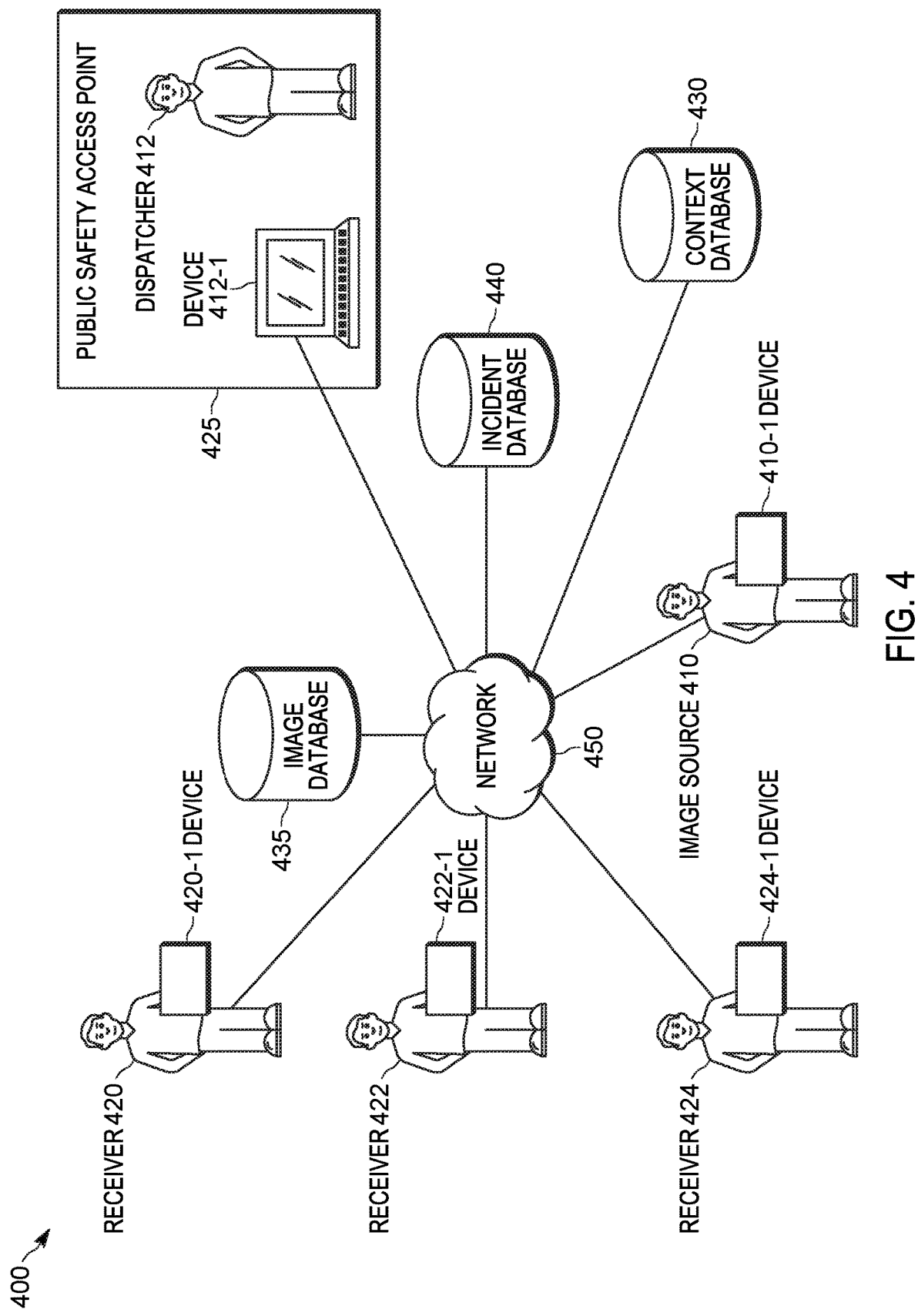
FIG. 4 is an example environment for sending and rendering an image by a device based on receiver's context in accordance with some embodiments.

FIG. 4 is an example environment for sending and rendering an image by a device based on receiver's context in accordance with some embodiments.

Environment 400 may include image source 410 and receivers 420, 422, 424. Each of the image source and receivers may be associated with devices 410-1, 420-1, 422-1, 424-1. Environment 400 may also include a public safety access point (PSAP) 425, which includes dispatcher 412, and device 412-1 associated with the dispatcher. Environment 400 may also include context database 430, image database 435, and incident database 440. The elements described in environment 400 may be coupled to each other via network 450.

Image source 410 may be the source of an image on which the techniques described herein operate. For example, image source 410 may be a public safety field officer who is capturing an image of a scene of interest. For example, image source 410 may be capturing an image of a crime or accident scene. The particular reason why a scene is being captured may be relatively unimportant. What should be understood is that every image has an image source.

Image source 410 may be associated with a device 410-1. For example, device 410-1 may include an image capture function, such as that provided by a camera. Device 410-1 may also include additional functionality, such as the ability to process a captured image in accordance with the techniques described herein. For example, device 410-1, in accordance with some implementations, may be used, in addition to capturing the image, to process the image based on the context of the intended image recipients. Device 410-1 may determine the context of the intended recipients, analyze the image to determine higher priority objects according to the determined contexts, and encode the images such that higher priority objects appear clearer to the intended recipients prior to the remainder of the image, as was described with respect to FIGS. 3(A-C) and will be described in further detail below.

Although device 410-1 is being referred to as a single device, it should be understood that the functionality provided by device 410-1 may actually be provided by several physically independent devices. For example, the image capture functionality may be provided by a standalone camera, a vehicle mounted camera, a body worn camera, or any other suitable image capture device. Processing functionality to determine the context of image recipients, analyze an image, and send the image to recipients may be provided in a separate physical device. For example, a police officer may have an on vehicle computing device which performs the context gathering and image analysis. In some cases, device 410-1 may be a single device. For example, a broadband device such as an LTE enabled smartphone.

Public safety access point 425 may be an access point, such as an emergency call center, where calls for emergency services are received. Public safety access point 425 may include many different personnel, such as emergency call takers, dispatchers, supervisors, etc. For ease of description, all such personnel are referred to in environment 400 as dispatchers 412. Dispatchers 412 may be responsible for receiving emergency call information in the public safety access point 425 and dispatching receivers 420, 422, 424 to respond to those incidents. Receivers 420,422,424 may also be referred to as field personnel or public safety field personnel.

Public safety access point 425 and dispatcher 412 may be associated with device 412-1. Device 412-1 may be devices used by the public safety access point in managing incidents. For example, device 412-1 may include a computer aided dispatch (CAD) system, which allows dispatcher 412 to dispatch field personnel 420, 422, 424 to incidents and keeps track of which incident and the nature of the incident that each field person has been assigned to. Device 412-1 may also be used to keep track of the task each individual field person is currently engaged in with respect to the particular incident that the field person is responding to. The information related to each incident and the assignments of field personnel responding to those incidents may be stored in incident database 440.

In other words, incident database 440 may store data related to all incidents being handled by public safety access point 425, field personnel 420, 422, 424 assigned to those incidents, the roles of those field personnel, and the tasks currently assigned to those personnel. Roles for a user may include roles such as an individual responder, an incident commander, higher level supervisor, etc. The particular role held by receiver 420, 422, 424 may be an input in determining the context of the receiver. The task assigned to receiver 420, 422, 424 may be used in determining the context of a receiver. For example, different responders, even when responding to the same incident, may be assigned different tasks (e.g. at a car accident scene, one officer may be assigned to accident investigation, while another in assigned to traffic control). Information related to roles and assigned tasks may be utilized when determining the context of an individual image receiver, as will be described in further detail below.

Incident database 440 may also keep track of data with respect to relationships between receivers 420, 422, 424. For example, incident database may keep track of talkgroups (e.g. groupings used for public safety radio communications) which indicate which other receivers 420, 422, 424 are currently communicating with each other. Such information may be utilized to determine the context of a group of receivers.

Context database 430 may be used to store the current context of receivers 420,422,424. For example, each receiver may report their own current context and the reported context may be stored in context database 430. In other implementations, the public safety access point 425 may use information stored in incident database 440 to determine the context of each receiver. A given user's context may be based on the user's currently assigned incident, role, task, and any other factor that may be utilized to determine which context (and thus which objects are of higher priority) are associated with a receiver. Context database 430 may also store the objects that are of interest to a given context. For example, vehicle license plates may be objects of interest when in a vehicle search context, while human faces may be the objects of interest in a suspect search context. What should be understood is that context database 430 may be used to determine the objects of interest of receivers 420, 422, 424 based on their current contexts.

Image database 435 may be used to store images that are to be sent to receivers 420, 422, 424. In some cases, images may be sent to the receivers directly from image source 410. In other cases, images may first be stored in image database 435. For example, device 410-1 may not contain the processing power needed to analyze an image based on context. Device 410-1 may first cause the image to be stored in image database 435. For example, image source 410 may upload the image to the image database by first sending the image to public safety access point 425. Public safety access point may then process the image that was stored in image database 435 in accordance with the techniques described herein.

Receivers 420,422,424 may be public safety field personnel that are to receive an image in accordance with the techniques described herein. Each of the receivers may be associated with a device 420-1, 422-1, 424-1. These devices may allow the receiver to view an image sent to the receiver. For example, the devices may be a smartphone equipped with an LTE connection and containing a display screen to allow images to be seen. In some cases, the devices may also be used to report the associated receiver's context to the image source or to context database 430. For example, the receiver may be requested to enter his current context (e.g. based on the receiver's current activities). This context information may then be used to determine objects in an image that are of importance given the context. Although a smartphone is provided as an example of a device that may be utilized by receivers 420,422,424 it should be understood that the techniques described herein are not limited to any particular type of device. Any device that may be used to receive an image may be suitable for use with the techniques described herein.

Network 450 may be used to allow the devices and entities depicted in environment 400 to communicate with one another. Network 450 may be a publically available network, such as a publically available cellular network or LTE network. Network 450 may be a private LTE network. Network 450 may be a public safety limited access network. In some cases, network 450 may be an ad hoc network that allows the devices and entities depicted in environment 400 to communicate directly with one another without using any type of centralized network. What should be understood is that network 450 represents communications paths between the devices and entities depicted in environment 400. Network 450 is not intended to depict any particular network topology.

In operation, image source 410 may capture an image using device 410-1. For example, image source 410 may be a public safety field officer who has captured an image of a crime scene using a camera that is associated with (or integrated within) device 410-1. It may be desired to send the captured image to receivers 420, 422, 424 using the techniques described herein. In one use case, all receivers may have the same context. For example, the incident database may indicate that all receivers are currently engaged in the same incident are all currently assigned to the same task. As another example, the incident database may indicate that all receivers are currently associated with the same talkgroup, and as such, may be considered to be a single entity. In the current example, all receivers may have the same role (e.g. all receivers are individual field personnel). What should be understood in the initial example is that all receivers 420,422,424 have the same context and as such, should all be receiving the same image.

In one implementation, the device 410-1 associated with the image source 410 may determine the context associated with the receivers. This determination may be from querying the context database, from a direct query of the receivers, from an analysis of the incident database, from a dispatcher query, or from any other suitable mechanism for determining the receiver's context. The image source may then analyze the image using known image object detection techniques based on the context. In other words, the device 410-1 may determine which objects are of higher priority based on the current context of the receivers. For example, if all of the receivers are engaged in a vehicle search, license plate objects may have the highest priority. In some implementations, user device 410-1 may analyze the image to detect higher priority objects (e.g. license plates) and encode the image using the techniques described with respect to FIGS. 3(A-C) such that higher priority objects appear clear to the receivers prior to other portions of the image. Device 410-1 may then send the encoded image to receivers 420,422,424.

In some implementations, rather than device 410-1 determining the receiver's context, device 410-1 may offload that functionality to device 412-1 associated with public safety access point 425. For example, device 410-1 may not have the requisite processing power to perform the image analysis techniques and thus offloads that processing to device 412-1 which may have greater processing power. Device 410-1 may send the original image to be stored in image database 435. Device 412-1 may then retrieve the image from image database and perform the same process that was just described (e.g. determining receiver context, analyzing and encoding image based on context, and sending the encoded image to the receivers).

In another use case, receivers 420,422,424 may have different contexts. For example, the context of receivers 420,422 may indicate that human faces are the objects of greatest interest to those receivers. Receiver 424 may have a context that indicates vehicle license plates are the objects of greatest interest. In the current example use case it may be assumed that neither one of the contexts has higher priority over the other. In such a use case, objects of higher priority to each context may be merged, forming a context that is a superset of the objects of importance to each specific context. The merging of contexts is described in further detail with respect to FIGS. 5(A-C). As above, either the image source 410 or the public safety access point 425 may analyze the image according to the context to identify objects of interest in the image. The image may then be encoded such that those high priority objects appear clear in the image prior to the remainder of the image.

In another use case, receivers 420,422,424 may not only have different contexts, but those contexts may have different priorities. For example, receiver 420 may have a context indicating that license plates are of the high importance to that context. Receivers 422,424 may have contexts indicating human faces are of high priority. However, receiver 420 may have a role (e.g. is an incident commander, supervisor, etc.) which indicates that the context associated with receiver 420 is of higher priority than that associated with the other receivers. Objects of importance may then be serialized based on the priority of the contexts. For example, because the context associated with receiver 420 may have a higher priority than the context associated with receivers 422,424, the image may be encoded such that objects associated with the higher priority context appear clear in the image prior to objects associated with the lower priority context, which in turn appear clear prior to the remainder of the image. An example of serializing contexts is described with respect to FIGS. 6(A-C).

Although the example above associated priority of context with a receiver's role, the techniques herein are not limited to any particular mechanism for determining priority of one context over another. For example, a commander acting in a passive oversight role may have a context with a low priority. However, if that same commander takes over control of an incident, the priority of that commander's context may be raised. What should be understood is that every receiver may have a context based on incident, role, assigned task, and other related criteria. That context may be associated with objects of interest for that context. The context may also be associate with a priority. The combination of context and priority may be used when serializing contexts.

FIGS. 5(A-C) depicts an example of rendering an image by a device based on a merged context in accordance with some embodiments. As mentioned above, in some cases, there may be users with different contexts receiving the image. In accordance with some embodiments, the contexts of each of the recipient's context may be merged in order to create a super set of objects of interest for all recipients. In the example describe in FIGS. 5(A-C) assume that there are two intended recipients, each of which has their own context. Furthermore, assume that neither context has higher priority over the other context.

For example, assume that the context associated with the first recipient indicates that objects of interest are license plates. The context associated with the second recipient may indicate that human faces are the objects of interest. Thus, a merged context may be synthesized in which both license plates and human faces are objects of interest, and each of those object types may have equivalent priority.

Figure 5A:
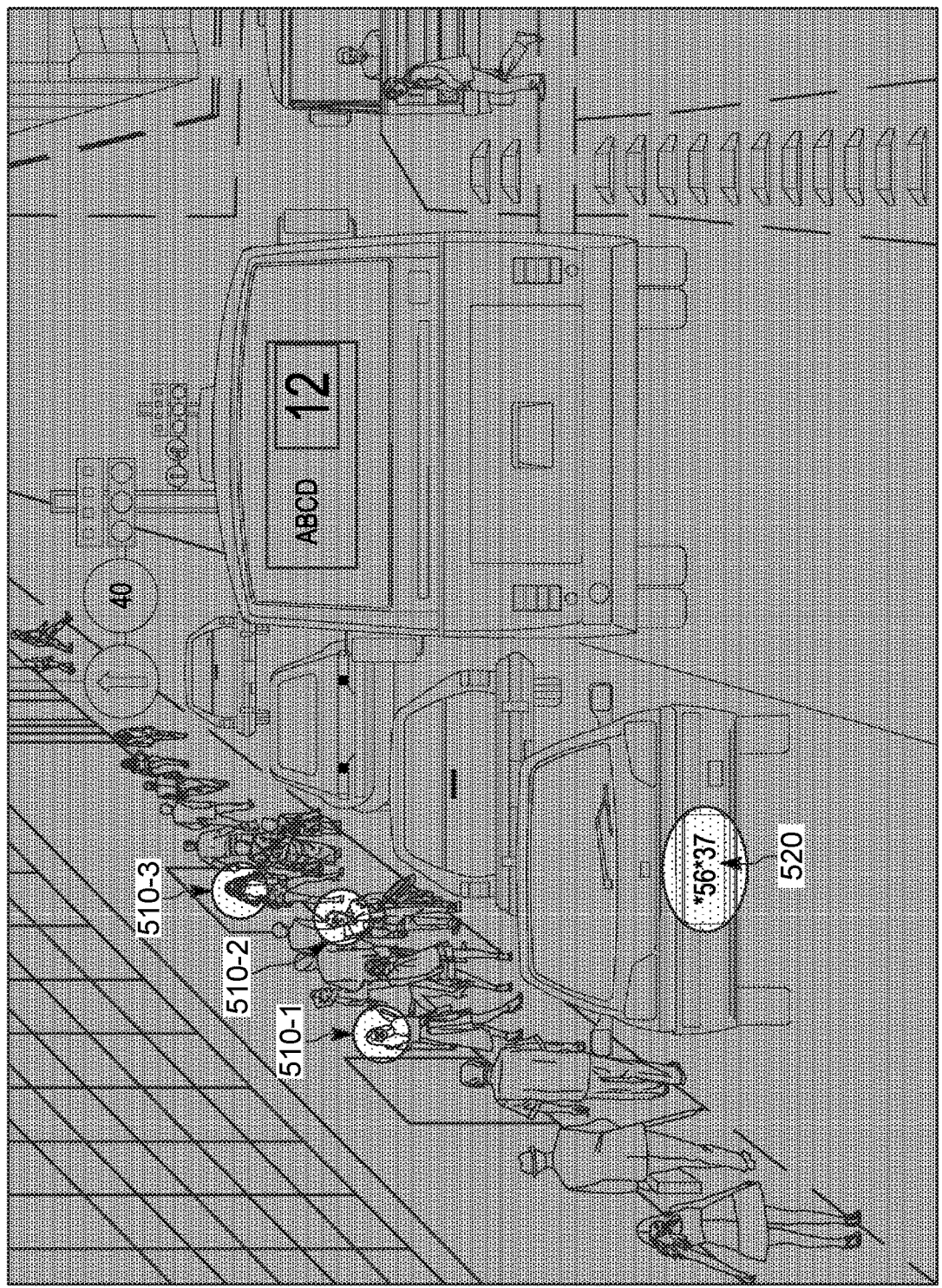
FIGS. 5(A-C) depicts an example of rendering an image by a device based on a merged context in accordance with some embodiments.

FIG. 5A may depict the original image of FIG. 1 after the first image increment is sent using the merged context. As shown, both the license plate objects 520 and face objects 510-1,2,3 are shown with greater clarity than they were in comparison to the first increment depicted in FIG. 2A. Just as above, the bandwidth used to allow the objects of interest to appear clearer in the first increment comes at the expense of the other objects in the image appearing less clear. Thus, the other objects in FIG. 5A (e.g. bus route number, remainder of the image) appear even less clear than they did in FIG. 3A.

Figure 5B:
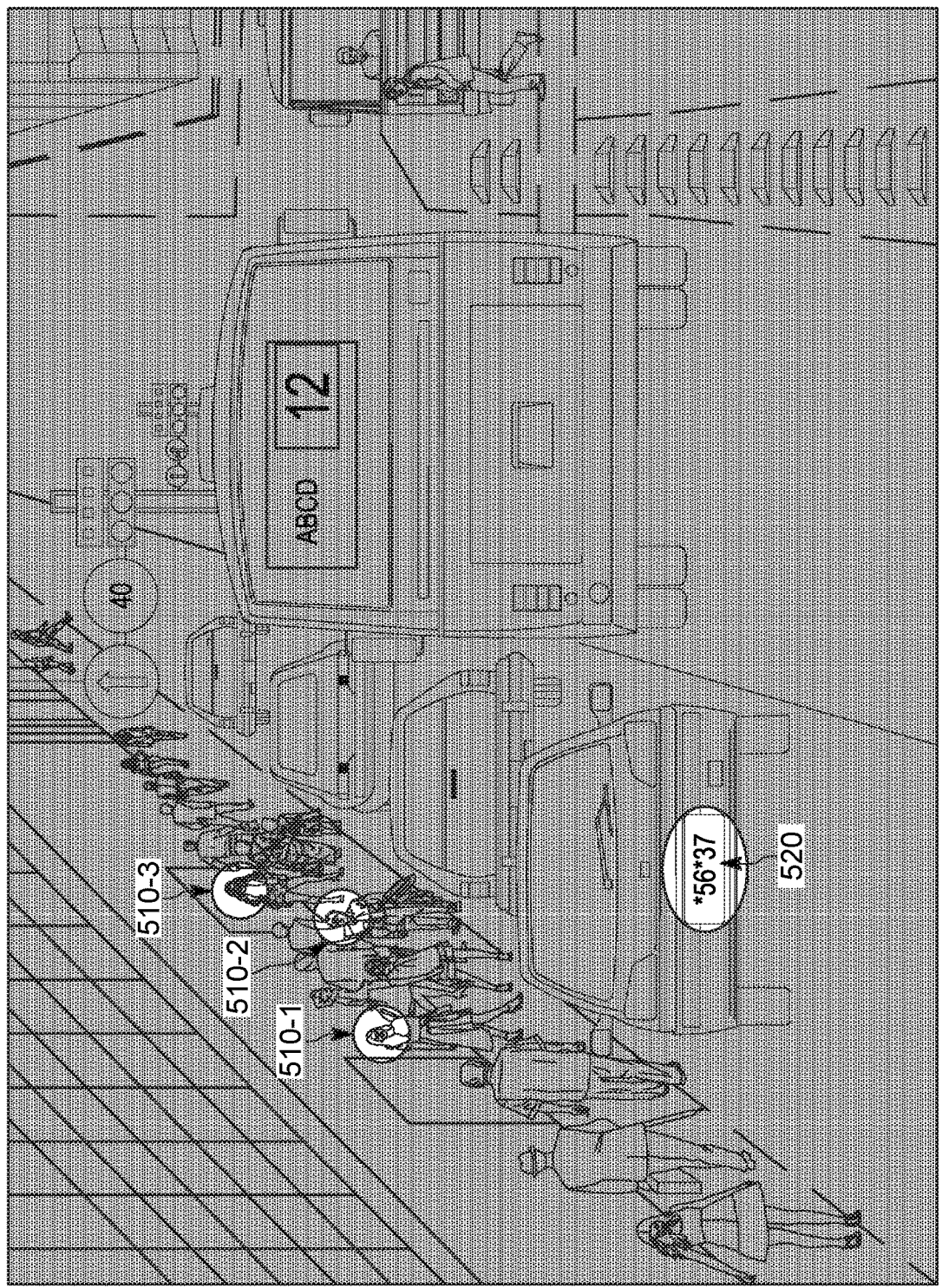

FIG. 5B may depict the original image after the second increment is sent. As shown, the objects of interest, license plates 520 and faces 510-1,2,3 may appear in the second increment as clearly they did in the original image. Again, this clarity may come at the expense of the remainder of the image.

Figure 5C:
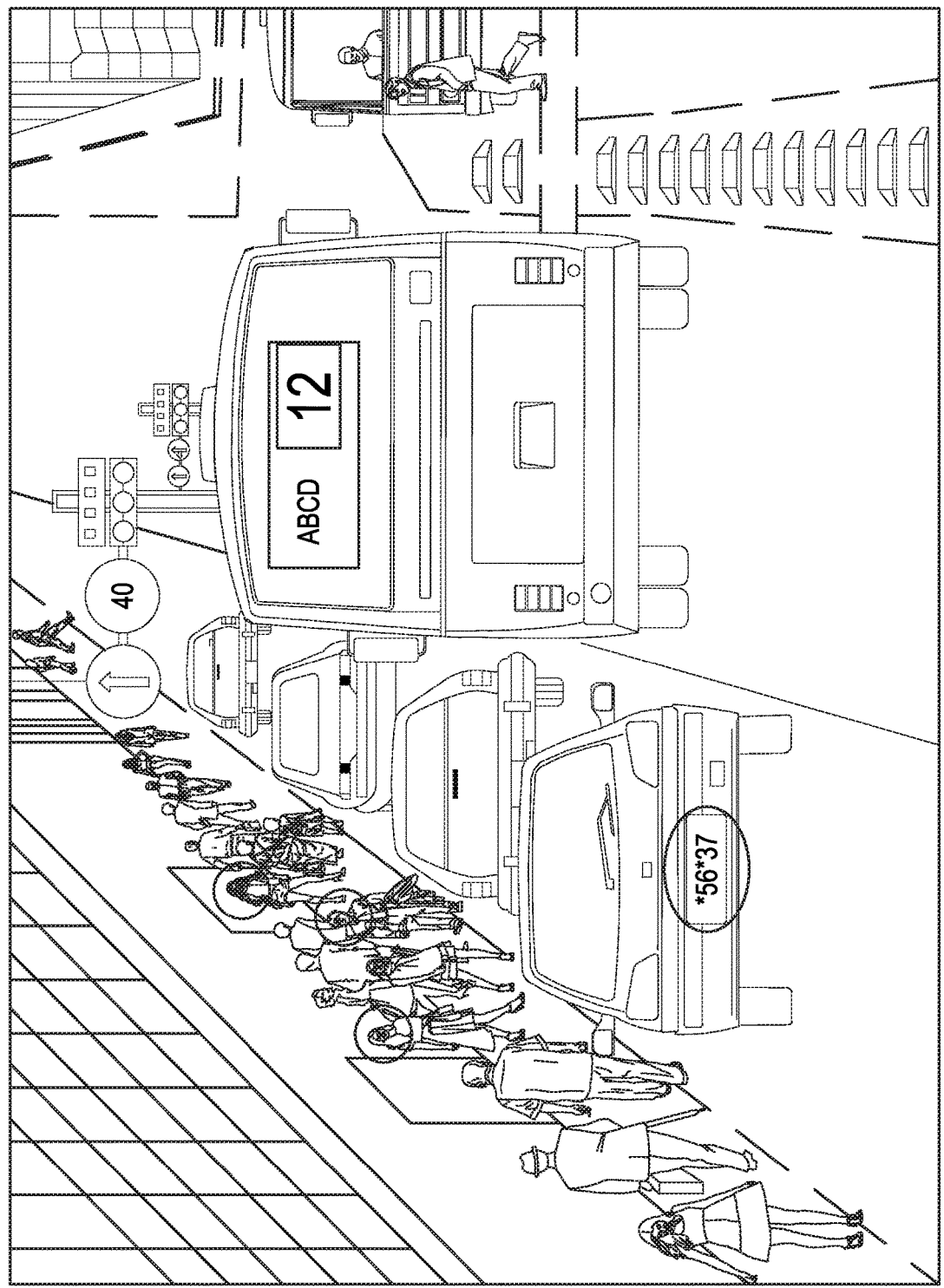

FIG. 5C may depict the original image after the third increment is sent. As above, because the objects of interest have been completely sent in the first and second increments, the bandwidth of the third increment is fully available for sending the other objects (e.g. bus route number) and the remainder of the image. Thus, after receipt of the third increment, the original image is now available to all the recipients.

FIGS. 6(A-C) depicts an example of rendering an image by a device based on a serialized context in accordance with some embodiments. As mentioned above, in some cases, there may be users with different contexts receiving the image, and the contexts of those users may have different priorities. In accordance with some embodiments, the contexts of each of the recipient's context may be serialized based upon the priorities in order to create a prioritized list of objects of interest for all recipients. In the example describe in FIGS. 6(A-C) assume that there are two intended recipients, each of which has their own context. Furthermore, assume that the context of the first recipient has higher priority than the context of the second recipient.

For example, assume that the context associated with the first recipient indicates that objects of interest are human faces. The context associated with the second recipient may indicate that license plates are the objects of interest. Assume that the context of the first recipient has a higher priority than the context of the second recipient. Thus, a serialized context may be synthesized in which human faces are the highest priority, and thus appear clear in the image prior to other objects. License plates may be the next highest priority, and thus appear clear in the image next. Finally, other objects and the remainder of the image may appear clear.

Figure 6A:
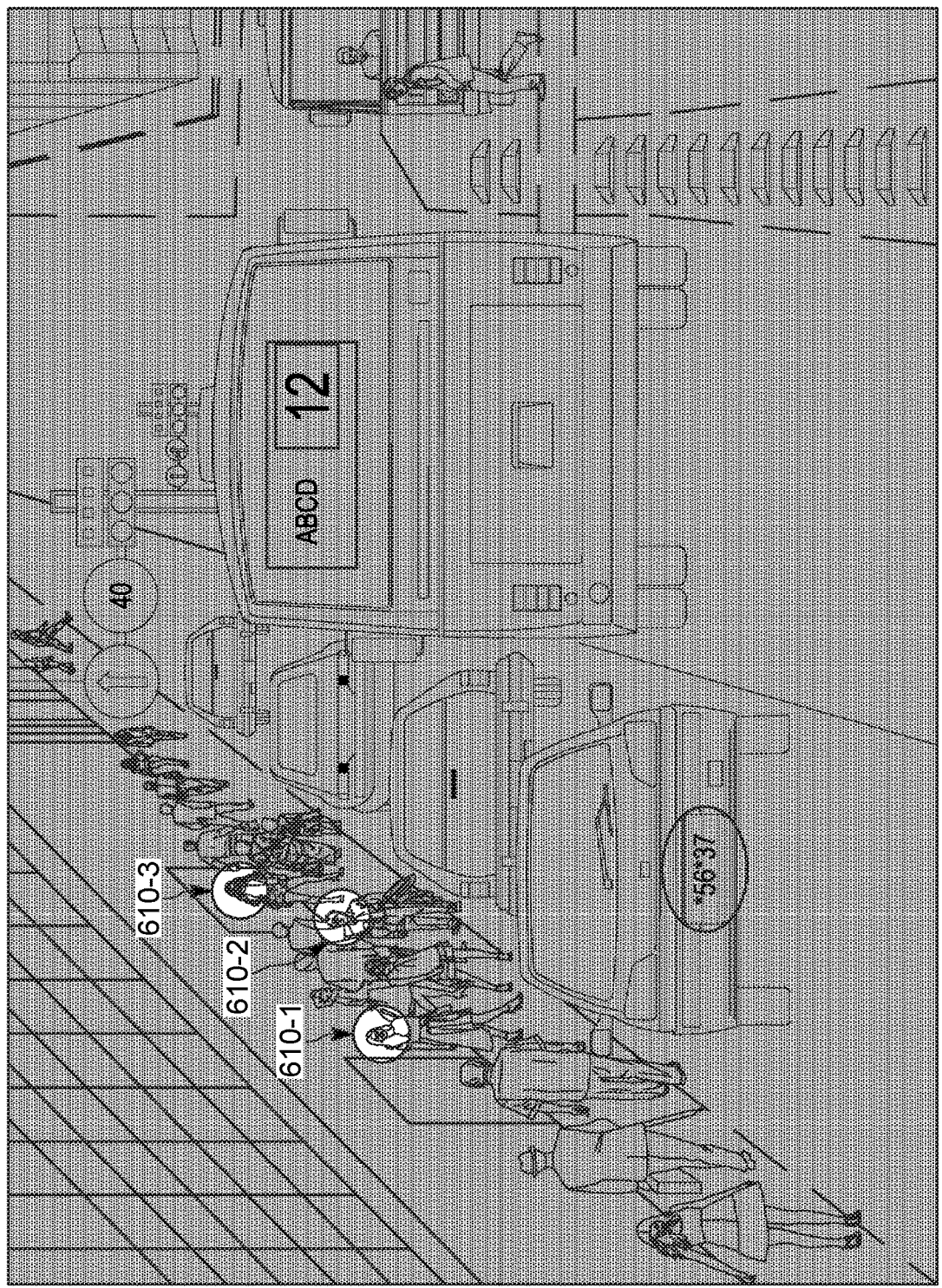
FIGS. 6(A-C) depicts an example of rendering an image by a device based on a serialized context in accordance with some embodiments.

FIG. 6A may depict the original image of FIG. 1 after the first image increment is sent using the merged context. As shown, the human face objects 610-1,2,3 are shown with greater clarity than they were in comparison to the first increment depicted in FIG. 2A. Just as above, the bandwidth used to allow the objects of interest to appear clearer in the first increment comes at the expense of the other objects in the image appearing less clear. Thus, the other objects in FIG. 6A (e.g. license plates, bus route number, remainder of the image) appear even less clear than they did in FIG. 3A. Unlike the case in FIG. 5A, where the license plate had the same priority as the human faces, in FIG. 6A, the license plate may have the same priority as the other objects in the image, until the highest priority object has been sent.

Figure 6B:
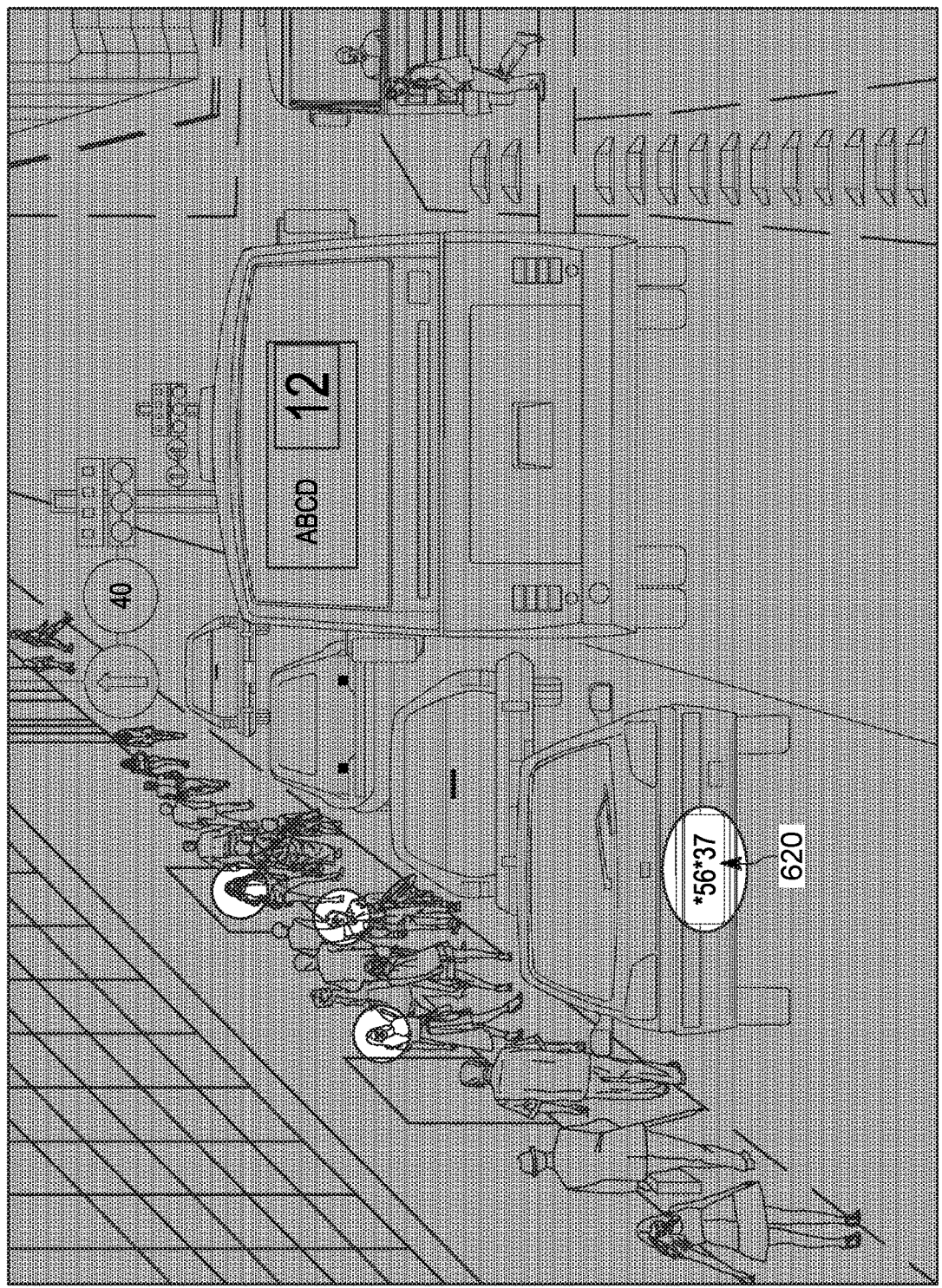

FIG. 6B may depict the original image after the second increment is sent. As shown, the next highest priority object of interest (e.g. license plate 620) is now the next highest priority object of interest. Thus, in the second increment, the next highest priority object of interest appears clear, prior to all other portions of the image. Again, this clarity may come at the expense of the remainder of the image.

Figure 6C:
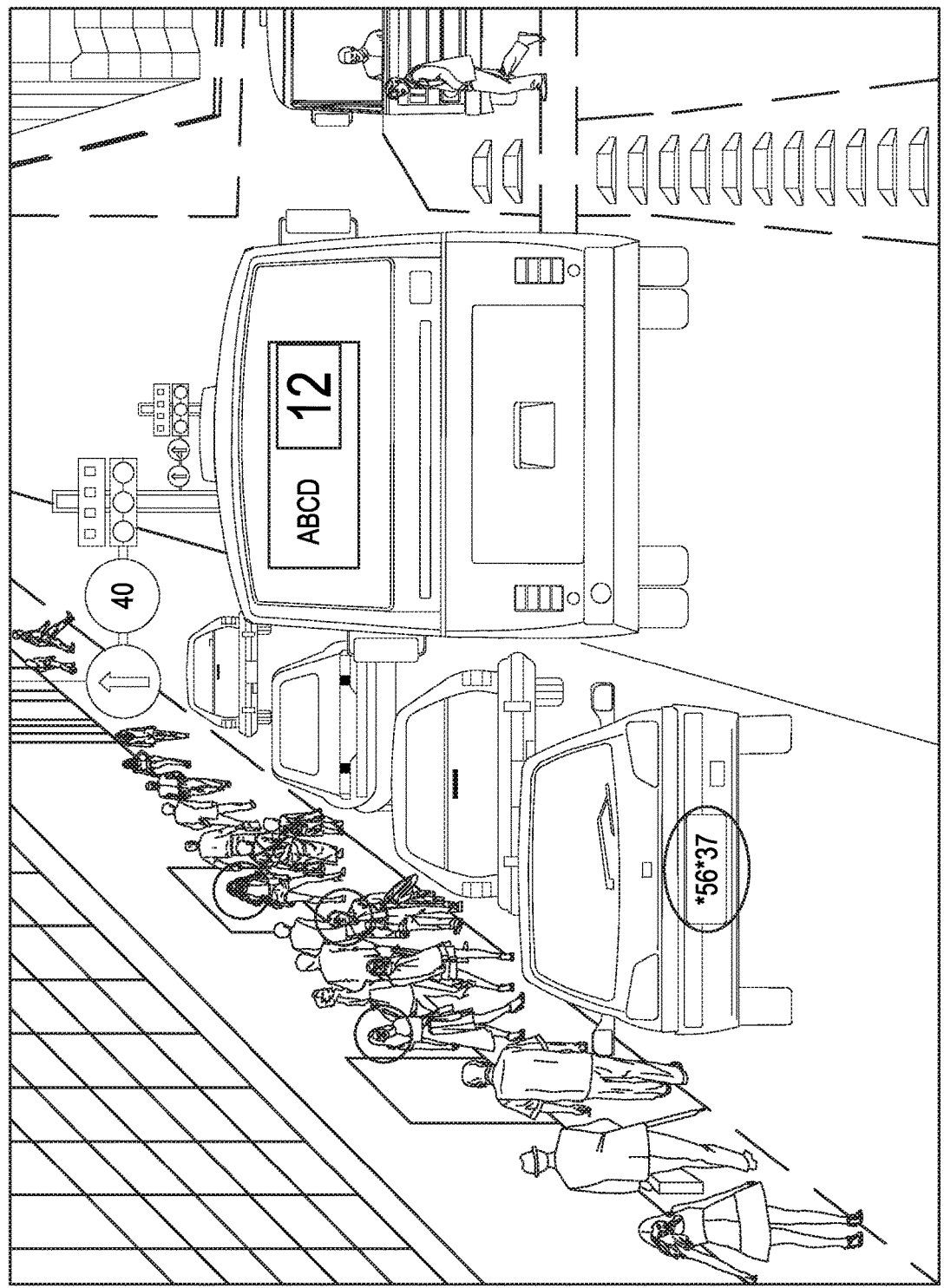

FIG. 6C may depict the original image after the third increment is sent. As above, because the objects of interest have been completely sent in the first and second increments, the bandwidth of the third increment is fully available for sending the other objects (e.g. bus route number) and the remainder of the image. Thus, after receipt of the third increment, the original image is now available to all the recipients.

It should be further understood that in some embodiments, merging contexts and serializing context priority may be combined. For example, consider a case where there are three different recipients, each with their own context, with each context having different objects of interest, while two of the contexts are higher priority than the third. For example, the first recipient context may be suspect search, with human faces being objects of interest, and having a certain priority level. The second context may be vehicle search, with objects of interest being license plates, and having the same priority as the suspect search. The third context may be a witness search context, with objects of interest being bus route numbers (e.g. perhaps to identify people on the bus who may have witnessed a crime), with objects of interest being bus route numbers, and having a priority lower than the previous two contexts.

When sending the image, the contexts of the first and second recipients may be merged, as was described in FIGS. 5(A-C) in order to create a superset of the objects of interest (e.g. faces and license plates). Because these objects have the highest priority, those objects may appear clear in the image prior to other objects in the image. Once the highest priority objects have been sent, the next highest priority objects (e.g. bus route numbers) may be sent. Finally, the remainder of the image may be sent.

It should further be understood that the above description is not intended to be limited to any specific number of priority levels. What should be understood is that objects associated with a given priority level appear clear in the received image prior to objects of lower priority. The particular number of priority levels is unimportant.

Figure 7:
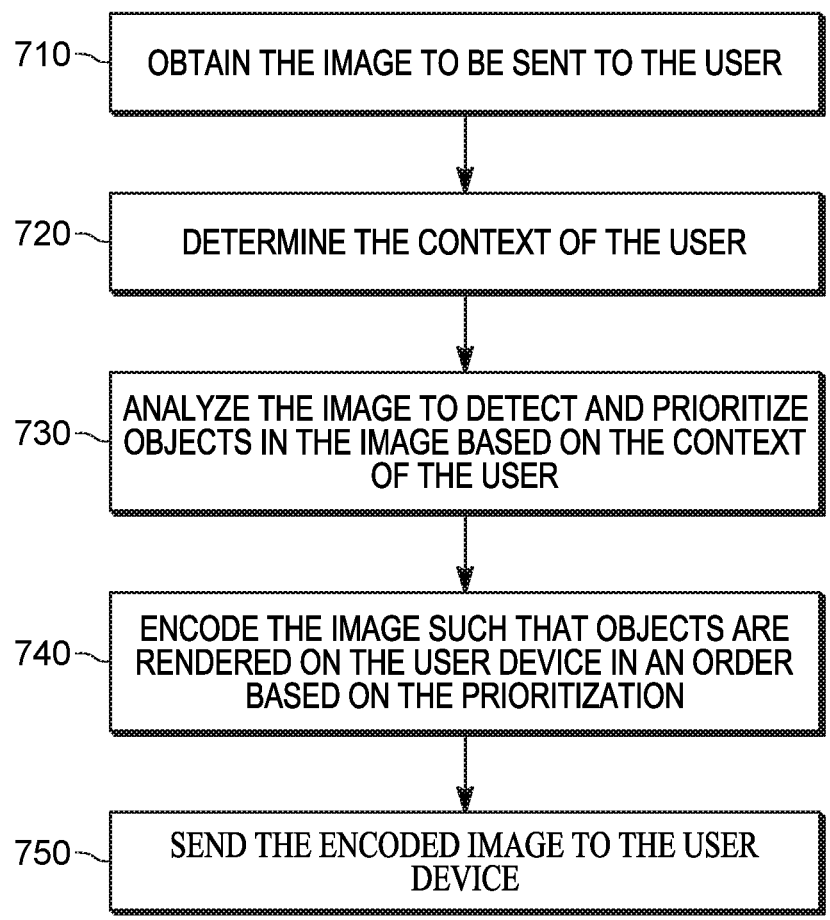
FIG. 7 is an example flow diagram for sending an image based on a user's context in accordance with some embodiments.

FIG. 7 is an example flow diagram for sending an image based on a user's context in accordance with some embodiments. In block 710, the image to be sent to the user device may be obtained. As explained above, in some cases, the image may be obtained from an image capture device, such as a camera, associated with personnel located at the source of the image. In other cases, the image may be retrieved from a database of images previously sent. The particular source of the image is unimportant. What should be understood is that an image that is to be sent to one or more recipients is obtained and any particular source of the image is suitable for use with the techniques described herein.

In block 720 a context of the user may be determined. In the present example, the image obtained in block 710 may be intended to be sent to a user. That user may have an associated context. As explained above, the context associated with the user may determine which objects in an image are of importance to that particular context and as a result are important to the user that will be receiving the image.

In block 730, the image may be analyzed to detect and prioritize objects in the image based on the context of the user. As explained above, there are many known techniques for analyzing an image to detect objects of interest. These techniques may be used on the image to be sent to the user to detect objects that are of interest to the user, based on the context. In some cases, a given user context may have multiple objects of interest associated with it. The objects may have different priorities. The image may be analyzed to detect objects of interest, and then those objects may be prioritized.

In block 740, the image may be encoded such that objects are rendered on the user device in an order based on the prioritization. As described above, the image may be encoded such that the image is sent in increments to the user. The image may be encoded such that higher priority objects are included in earlier sent increments, thus allowing those higher priority objects to be clearly rendered on the user device prior to lower priority objects and the remainder of the image.

In block 750, the encoded image may be sent to the user device. As explained above, send the image to the user device may include sending the image in multiple increments, with the image (or portions of the image) becoming clearer as each additional increment is received by the user device. Based on the encoding described in block 740, the image may be sent such that data associated with the higher priority objects is sent with earlier increments, while data associated with lower priority objects is sent in later increments.

Figure 8:
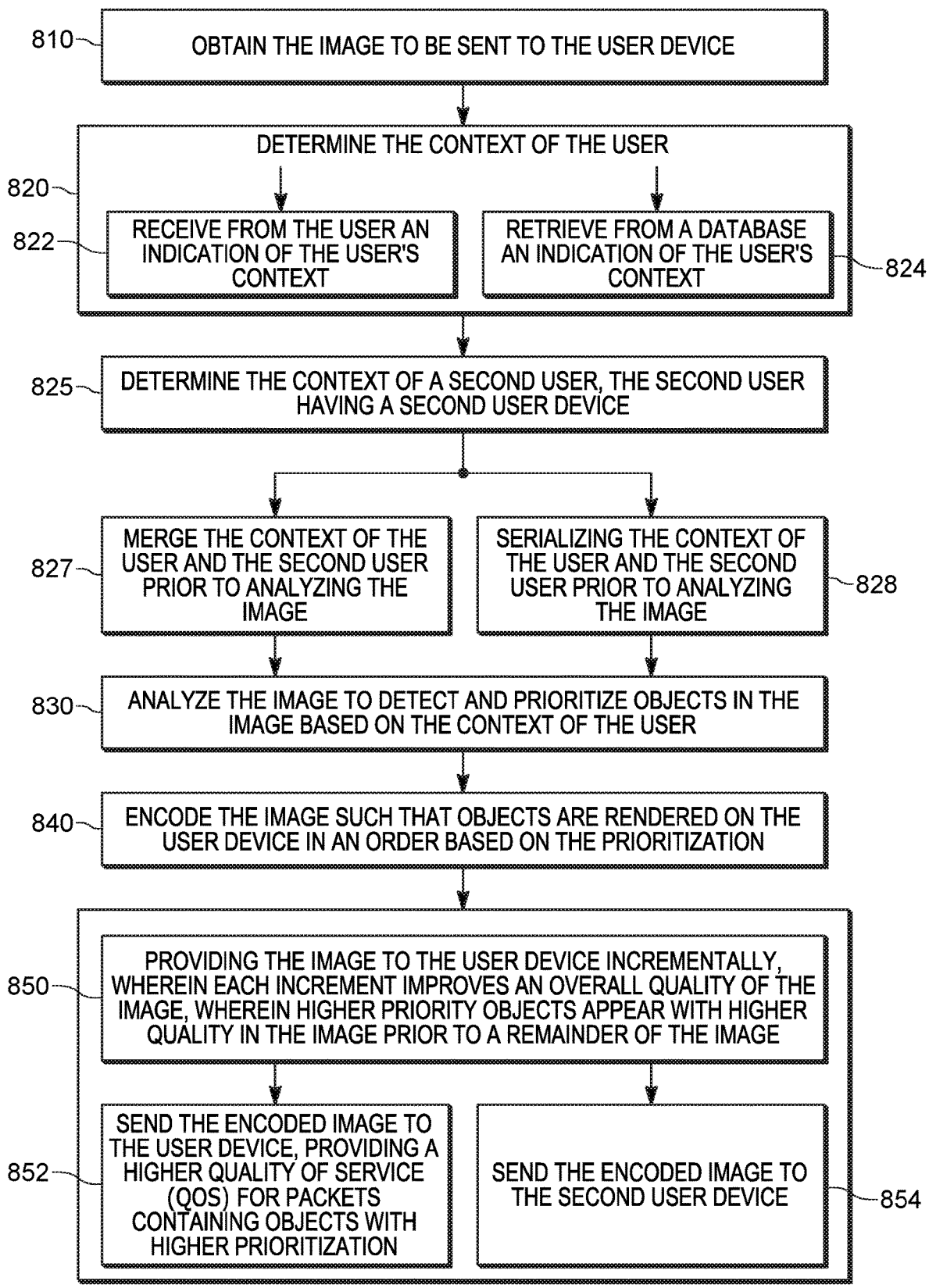
FIG. 8 is an example of a more detailed flow diagram for sending an image based on a user's context in accordance with some embodiments.

FIG. 8 is an example of a more detailed flow diagram for sending an image based on a user's context in accordance with some embodiments. In block 810, the image to be sent to the user device may be obtained. Just as above, with respect to block 710, the source of the image is relatively unimportant. Any suitable image source may be utilized with the techniques described herein.

In block 820, the context of the user may be determined. In block 822, an indication of the user's context may be received from the user. As explained above, a user may explicitly provide his current context, which in turn indicates the objects that are of greatest interest to that user. The user may provide his context through the device (e.g. 420-1) that is associated with the user. For example, the user may have an app installed on his device that allows him to select from a list of possible contexts, depending on the activity the user is currently engaged in.

In block 824 an indication of the user's context may be retrieved from a database. As explained above, a database may exist that includes the user context. For example, the system described in FIG. 4 may include a computer aided dispatch system that indicates what task a user is currently engaged in. The task may be associated with a context, and as such the context is stored in a database. In some implementations, a database may list every possible user, with a context associated with each user. In other implementations, a user's radio traffic may be monitored to detect certain keywords. A database may store an association of keywords to context (e.g. keyword "missing" may be associated with a context of missing person search). As explained above, a context may comprise at least one of a role, a talk group, a device capability, skills, equipment and assigned task In block 825, the context of a second user may be determined. The second user may have a second user device. As explained above, an image may be sent to multiple recipients. Each of those recipients may be engaged in different tasks, and as such may be associated with different contexts. In block 825, a context of a second user may be identified, using the same techniques described in block 820, 822, 824 to determine the context of the first user. Although not shown in FIG. 8, it should be understood that in some implementations, the context of the user and the second user are handled independently. In other words, the process for send the image to the second user may mirror the process used for sending the image to the first user, such that each user receives an image with prioritized objects based on their own context, without regard to the context of the other user.

In block 827, the context of the user and the second user may be merged prior to analyzing the image. As described above with respect to FIG. 5, in some cases the context of the first and second user may be of equal priority. Thus, the objects of interest of one context has the same importance as the objects of interest of the other context. As such, the objects of interest to each context should appear clear at the recipient's device at the same time, with neither one appearing more clearly than the other. In other words, all identified objects are to have the same priority, and are prioritized in the image encoding accordingly.

In block 828 the context of the user and the second user may be serialized prior to analyzing the image. As explained with respect to FIG. 6, in some cases, one user's context may have a higher priority than another user's context. As such, objects of interest for the higher priority context should appear clear before objects of interest of the lower priority context. By serializing the contexts prior to analyzing the image, the analysis can occur taking into account that some objects are of higher priority than others.

In block 830, the image may be analyzed to detect and prioritize objects in the image based on the context of the users. The techniques described herein are not dependent on any specific mechanism for detection of objects in an image, and many image object classifiers are known. What should be understood is that the image may be analyzed using known techniques to detect objects of interest in the image based on the context of the users. The objects may be included in a prioritized list, such that objects of higher priority appear clear prior to objects of lower priority. As mentioned above, in some cases, the analyzing the image to detect and prioritize objects may occur on a device that captures the image. In other cases, the analyzing step may occur at a central location, such as the PSAP depicted in FIG. 4.

In block 840, the image may be encoded such that objects are rendered on the user device in an order based on the prioritization. As explained above with respect to FIGS. 3, 5, and 6, the image may be encoded such that when rendered on the recipient's device, objects of interest with higher priority appear clearer sooner than objects of interest of lower priority which in turn appear clearer sooner than the remainder of the image. The encoding in block 840 ensures that the objects of interest with the highest priority are the first objects to appear clear to the recipients.

In block 850 the image may be provided to the user device incrementally. Each increment may improve an overall quality of the image. Higher priority objects may appear with higher quality in the image prior to a remainder of the image. As explained with respect to FIGS. 3, 5, and 6, an image may be sent in multiple increments, with each increment casing the overall image to appear more clear. The encoding in block 840 creates the image increments such that the data associated with higher priority objects in the image are encoded in increments that are sent sooner than data associated with lower priority objects, or with the remainder of the image (e.g. portions of the image not identified as objects or objects of interest).

In block 852, the encoded image may be sent to the user device by providing a higher Quality of Service (QoS) for packets containing objects with higher prioritization. In other words, when the image is sent to the recipient, the packets containing data associated with higher priority objects (e.g. the earlier image increments) may be sent with better quality of service than other increments. For example, in some protocols, a packet may be marked as higher priority, meaning that it cannot be dropped under congestion conditions. In other cases, the network used to transmit the increments may be configured such that higher QoS parameters (e.g. bandwidth, guaranteed bit rates, etc.) are provided to packets containing earlier increments of the image, and normal QoS parameters are used for all other increments. In block 854, the image may also be sent to the second user device. It should be understood that the same incremental process used to send the image to the user device may also be used to send the image to the second user device. Furthermore, sending the image to the user device and the second user device may occur in parallel.

Figure 9:
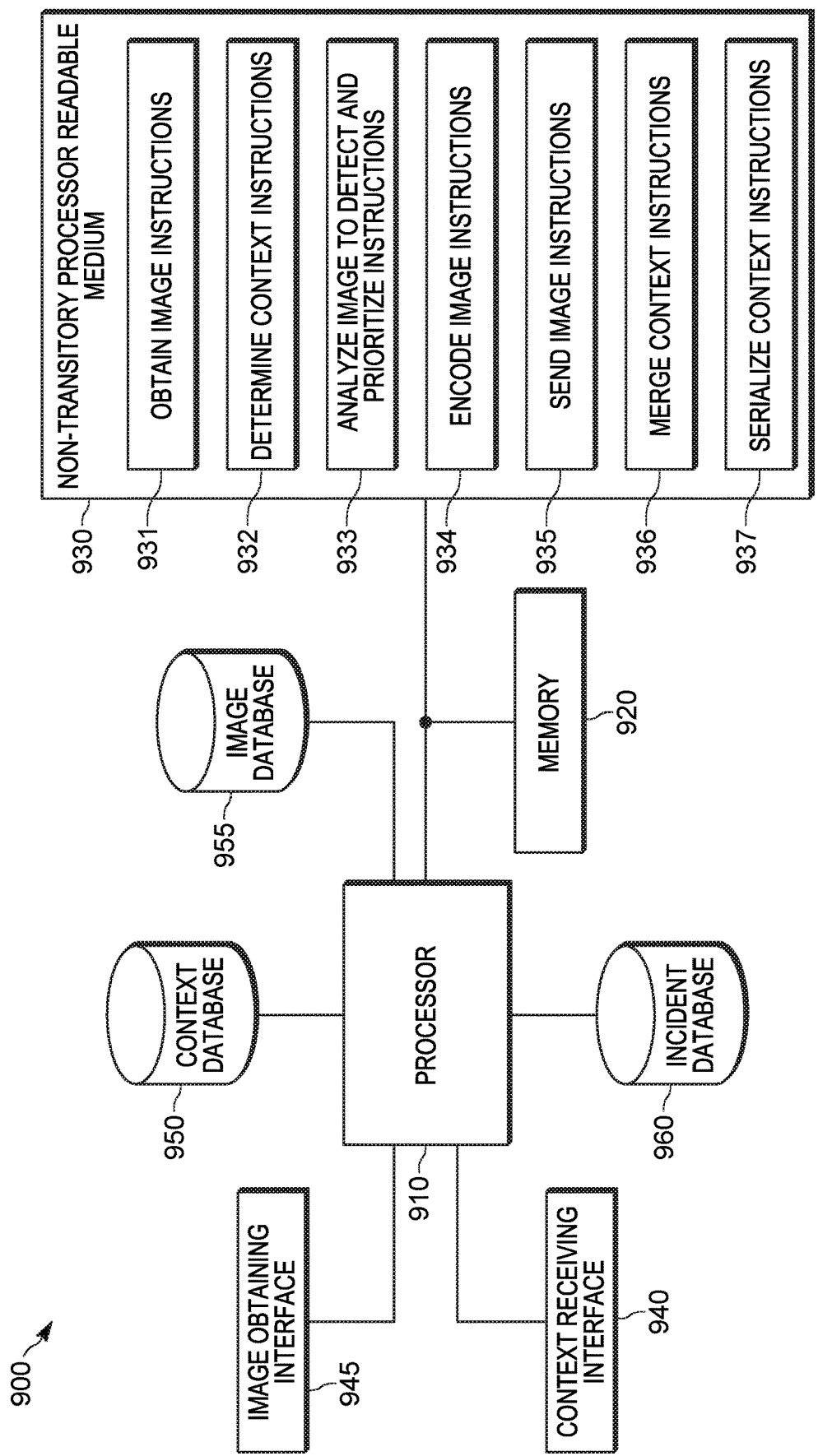
FIG. 9 is an example of a system including a non-transitory processor readable medium for sending an image based on a user's context in accordance with some embodiments.

FIG. 9 is an example of a system including a non-transitory processor readable medium for sending an image based on a user's context in accordance with some embodiments. System 900 may include processor 910, memory 920, non-transitory processor readable medium 930, context receiving interface 940, image obtaining interface 945, context database 950, image database 955, and incident database 960.

Processor 910 may be coupled to memory 920. Memory 920 may store a set of instructions that when executed by processor 910 cause processor 910 to implement the techniques described herein. Processor 910 may cause memory 920 to load a set of processor executable instructions from non-transitory processor readable medium 930. Non-transitory processor readable medium 930 may contain a set of instructions thereon that when executed by processor 910 cause the processor to implement the various techniques described herein.

For example, medium 930 may contain obtain image instructions 931. When executed by processor 910, obtain image instructions 931 may cause the processor to obtain an image from an image source. As described above, in some cases the image source may be associated with the processor 910 that executes the techniques described herein (e.g. a camera associated with public safety field personnel). Processor 910 may obtain the image using image obtaining interface 945. For example, image obtaining interface 945 may be an interface that allows processor 910 to retrieve an image from a camera associated with a user device. In some implementations, processor 910 may use image obtaining interface 945 to obtain an image from image database 955. For example, image database 955 may store images previously received from public safety field personnel, images received from member of the general public, or any other image sources. It should be understood that the techniques described herein are not dependent on any particular source of an image.

Medium 930 may contain determine context instructions 932. Processor 910 may use determine context instructions 932 to determine the context of a user that is to receive an image according to the techniques described herein. The context of a user may be determined from any number of sources. For example, context may be determined by receiving a context directly from an intended image recipient. Processor 910 may utilize context receiving interface 940 to receive a user's context directly from the user. For example, when sending an image according to the techniques described herein, processor 910 may utilize context receiving interface 940 to directly query a user with respect to the user's current context. In some cases, the query may be a simple voice request to the intended recipient. In other cases, the query may be to the intended recipient's device.

In some cases, processor 910 may utilize context receiving interface 940 to query a context database 950. As explained above, in some implementations, system 900 may monitor communications with public safety field personnel to recognize keywords in the communications. Those keywords may be associated with certain contexts. The contexts of user using those keywords may be stored in context database 950.

In some implementations, processor 910 may use context receiving interface 940 to receive a user's context form incident database 960. As explained above, a public safety access point may be responsible for, among other things, receiving calls for emergency service from the public, or others. An incident may be associated with each of these calls for service. A context may be associated with public safety responders to the incident. The context of each of these responders may be stored in incident database 960.

Medium 930 may also include analyze image to detect and prioritize instructions 933. For example, processor 910 may obtain an image using image obtaining interface 945 and a user context using context receiving interface 940. Processor 910 may then detect and prioritize objects in the image using instructions 933.

Medium 930 may also include encode image instructions 934. Processor 910 may use encode image instructions 934 to implement the techniques described herein. For example, encode image instructions may encode the image such that higher priority objects that were detected and prioritized using analyze and detect instructions 934 appear clear to an end user prior to other portions of the image. Medium 930 may also include send image instructions 935. Send image instructions 935 may cause processor 910 to send the image to intended recipients through a network, as was described above.

Medium 930 may also include merge context instructions 936. As explained above, in some cases an image may be sent to more than one recipient. Each recipient may have a different context. In some cases, merge context instructions 936 may be used by processor 910 to cause the context of all intended recipients to be merged prior to analyzing the image. Medium 930 may also include serialize context instructions 937. As explained above, in some cases an image may be sent to more than one recipient. Each recipient may have a different context. Each of the contexts may have a different priority. Serialize context instructions 937 may be used by processor 910 to cause the contexts of all intended recipients to be serialized, such that objects of interest for higher priority contexts will appear clear to intended recipients prior to objects of interest of lower priority.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for sending an image to a user device based on a context of a user of the device comprising:
   obtaining the image to be sent to the user device;
   determining the context of the user, wherein the context of the user further comprises an assigned task, wherein the determining the context of the user further comprises receiving from the user an indication of the user's context;
   analyzing the image to detect and prioritize objects in the image based on the context of the user;
   encoding the image such that objects are rendered on the user device in an order based on the prioritization;
   sending the encoded image to the user device;
   determining a context of a second user, the second user having a second user device;
   merging the context of the user and the second user prior to analyzing the image; and
   sending the encoded image to the second user device.

2. The method of claim 1 wherein encoding the image further comprises:
   providing the image to the user device incrementally, wherein each increment improves an overall quality of the image, wherein higher priority objects appear with higher quality in the image prior to a remainder of the image.

3. The method of claim 1 wherein the context further comprises at least one of a role, a talk group, a device capability, skills, and equipment.

4. The method of claim 1 wherein sending the image to the user device further comprises:
   providing a higher Quality of Service (QoS) for packets containing objects with higher prioritization.

5. The method of claim 1 wherein determining the context of the user further comprises:
   retrieving from a database an indication of the user's context.

6. The method of claim 1 further comprising:
   determining a context of a second user, the second user having a second user device;
   analyzing the image to detect and prioritize objects in the image based on the context of the second user;
   encoding the image such that objects are rendered on the second user device in an order based on the prioritization based on the context of the second user to create a second encoded image; and
   sending the second encoded image to the second user device.

7. The method of claim 1 further comprising:
   determining a context of a second user, the second user having a second user device, the context of the second user having a lower priority than the context of the user;
   serializing the context of the user and the second user prior to analyzing the image; and
   sending the encoded image to the second user device.

8. The method of claim 1 wherein analyzing the image to detect and prioritize objects further comprises:
   analyzing the image to detect and prioritize objects on a device that captures the image.

9. A non-transitory processor readable medium containing a set of instructions thereon that when executed by a processor cause the processor to:
   obtain an image to be sent to a user device;
   determine a context of a user of the user device, wherein the context of the user further comprises an assigned task, wherein the determining the context of the user further comprises receiving from the user an indication of the user's context;
   analyze the image to detect and prioritize objects in the image based on the context of the user;
   encode the image such that objects are rendered on the user device in an order based on the prioritization;
   send the encoded image to the user device;
   determine a context of a second user, the second user having a second user device;

merge the context of the user and the second user prior to analyzing the image; and send the encoded image to the second user device.

10. The medium of claim 9 wherein encoding the image further comprises instructions to:

provide the image to the user device incrementally, wherein each increment improves an overall quality of the image, wherein higher priority objects appear with higher quality in the image prior to a remainder of the image.

11. The medium of claim 9 wherein sending the image to the user device further comprises instructions to:

provide a higher Quality of Service (QoS) for packets containing objects with higher prioritization.

12. The medium of claim 9 wherein determining the context of the user further comprises instructions to:

retrieve from a database an indication of the user's context.

13. The medium of claim 9 further comprising instructions to:

determine a context of a second user, the second user having a second user device;

analyze the image to detect and prioritize objects in the image based on the context of the second user;

encode the image such that objects are rendered on the second user device in an order based on the prioritization based on the context of the second user to create a second encoded image; and send the second encoded image to the second user device.

14. The medium of claim 9 further comprising instructions to:

determine a context of a second user, the second user having a second user device, the context of the second user having a lower priority than the context of the user;

serialize the context of the user and the second user prior to analyzing the image; and send the encoded image to the second user device.

15. The medium of claim 9 wherein analyzing the image to detect and prioritize objects further comprises instructions to:

analyze the image to detect and prioritize objects on a device that captures the image.

16. A system comprising:

a processor; and a memory coupled to the processor, the memory containing a set of processor executable instructions thereon that when executed by the processor, cause the processor to:

obtain an image to be sent to a user device;

determine a context of a user of the user device, wherein the context of the user further comprises an assigned task, wherein the determining the context of the user further comprises receiving from the user an indication of the user's context;

analyze the image to detect and prioritize objects in the image based on the context of the user;

encode the image such that objects are rendered on the user device in an order based on the prioritization;

send the encoded image to the user device;

determine a context of a second user, the second user having a second user device;

merge the context of the user and the second user prior to analyzing the image; and send the encoded image to the second user device.

* * * * *